(12) United States Patent
Srinivasan et al.

(10) Patent No.: US 10,498,795 B2
(45) Date of Patent: Dec. 3, 2019

(54) SYSTEMS AND METHODS FOR ADAPTIVE SWITCHING BETWEEN MULTIPLE CONTENT DELIVERY NETWORKS DURING ADAPTIVE BITRATE STREAMING

(71) Applicant: DIVX, LLC, San Diego, CA (US)

(72) Inventors: Mayur Srinivasan, San Diego, CA (US); Stephen Bramwell, Peterborough (GB); Giang Pham, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 341 days.

(21) Appl. No.: 15/436,456

(22) Filed: Feb. 17, 2017

(65) Prior Publication Data

US 2018/0241796 A1     Aug. 23, 2018

(51) Int. Cl.
| | |
|---|---|
| *G06F 15/16* | (2006.01) |
| *H04L 29/06* | (2006.01) |
| *H04L 12/26* | (2006.01) |
| *H04L 29/08* | (2006.01) |

(52) U.S. Cl.
CPC .......... *H04L 65/80* (2013.01); *H04L 65/4084* (2013.01); *H04L 43/0888* (2013.01); *H04L 67/02* (2013.01); *H04L 67/1097* (2013.01)

(58) Field of Classification Search
CPC . H04L 43/0888; H04L 65/4069; H04L 65/80; H04L 67/02; H04L 67/1097
USPC ................. 709/217, 218, 219, 224, 226, 231
See application file for complete search history.

(56) References Cited

U.S. PATENT DOCUMENTS

| | | | |
|---|---|---|---|
| 4,009,331 | A | 2/1977 | Goldmark et al. |
| 4,694,357 | A | 9/1987 | Rahman et al. |
| 4,802,170 | A | 1/1989 | Trottier |
| 4,964,069 | A | 10/1990 | Ely |
| 5,119,474 | A | 6/1992 | Beitel et al. |
| 5,274,758 | A | 12/1993 | Beitel et al. |

(Continued)

FOREIGN PATENT DOCUMENTS

| | | |
|---|---|---|
| CN | 1169229 | 12/1997 |
| CN | 1221284 A | 6/1999 |

(Continued)

OTHER PUBLICATIONS

"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pgs.

(Continued)

*Primary Examiner* — Liang Che A Wang
(74) *Attorney, Agent, or Firm* — KPPB LLP

(57) ABSTRACT

Systems and methods for adaptive switching between multiple content delivery networks during adaptive bitrate streaming. In one embodiment, an adaptive content delivery network switching device includes a processor, a network interface, and a memory connected to the processor, where the memory contains a content delivery network switching application and, the content delivery network switching application directs the processor to receive content from a first content delivery network, determine a minimum performance threshold based on playback variables from the received content, receive new content from a second content delivery network if the minimum performance threshold is not satisfied.

21 Claims, 8 Drawing Sheets

(56) References Cited

U.S. PATENT DOCUMENTS

| | | |
|---|---|---|
| 5,361,332 A | 11/1994 | Yoshida et al. |
| 5,396,497 A | 3/1995 | Veltman |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,479,303 A | 12/1995 | Suzuki et al. |
| 5,487,167 A | 1/1996 | Dinallo et al. |
| 5,502,766 A | 3/1996 | Boebert et al. |
| 5,509,070 A | 4/1996 | Schull |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,589,993 A | 12/1996 | Naimpally et al. |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,403 A | 2/1998 | Stefik |
| 5,717,816 A | 2/1998 | Boyce et al. |
| 5,719,786 A | 2/1998 | Nelson et al. |
| 5,745,643 A | 4/1998 | Mishina |
| 5,751,280 A | 5/1998 | Abbott |
| 5,754,648 A | 5/1998 | Ryan et al. |
| 5,763,800 A | 6/1998 | Rossum et al. |
| 5,765,164 A | 6/1998 | Prasad et al. |
| 5,794,018 A | 8/1998 | Vrvilo et al. |
| 5,805,700 A | 9/1998 | Nardone et al. |
| 5,822,524 A | 10/1998 | Chen et al. |
| 5,828,370 A | 10/1998 | Moeller et al. |
| 5,841,432 A | 11/1998 | Carmel et al. |
| 5,844,575 A | 12/1998 | Reid |
| 5,848,217 A | 12/1998 | Tsukagoshi et al. |
| 5,867,625 A | 2/1999 | McLaren |
| 5,887,110 A | 3/1999 | Sakamoto et al. |
| 5,892,900 A | 4/1999 | Ginter et al. |
| 5,903,261 A | 5/1999 | Walsh et al. |
| 5,907,597 A | 5/1999 | Mark |
| 5,946,446 A | 8/1999 | Yanagihara |
| 5,956,729 A | 9/1999 | Goetz et al. |
| 5,959,690 A | 9/1999 | Toebes, VIII et al. |
| 5,999,812 A | 12/1999 | Himsworth |
| 6,031,622 A | 2/2000 | Ristow et al. |
| 6,038,257 A | 3/2000 | Brusewitz et al. |
| 6,044,469 A | 3/2000 | Horstmann |
| 6,046,778 A | 4/2000 | Nonomura et al. |
| 6,047,100 A | 4/2000 | McLaren |
| 6,058,240 A | 5/2000 | McLaren |
| 6,064,794 A | 5/2000 | McLaren et al. |
| 6,065,050 A | 5/2000 | DeMoney |
| 6,018,611 A | 6/2000 | Nogami et al. |
| 6,079,566 A | 6/2000 | Eleftheriadis et al. |
| 6,097,877 A | 8/2000 | Katayama et al. |
| 6,141,754 A | 10/2000 | Choy |
| 6,155,840 A | 12/2000 | Sallette |
| 6,169,242 B1 | 1/2001 | Fay et al. |
| 6,175,921 B1 | 1/2001 | Rosen |
| 6,192,319 B1 * | 2/2001 | Simonson .............. G06Q 30/02 702/179 |
| 6,195,388 B1 | 2/2001 | Choi et al. |
| 6,204,883 B1 | 3/2001 | Tsukagoshi |
| 6,222,981 B1 | 4/2001 | Rijckaert |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,418,270 B1 | 7/2002 | Steenhof et al. |
| 6,449,719 B1 | 9/2002 | Baker |
| 6,466,671 B1 | 10/2002 | Maillard et al. |
| 6,466,733 B1 | 10/2002 | Kim |
| 6,510,513 B1 | 1/2003 | Danieli |
| 6,510,554 B1 | 1/2003 | Gordon et al. |
| 6,621,979 B1 | 9/2003 | Eerenberg et al. |
| 6,625,320 B1 | 9/2003 | Nilsson et al. |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,697,568 B1 | 2/2004 | Kaku |
| 6,725,281 B1 | 4/2004 | Zintel et al. |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,389 B1 | 10/2004 | Meyer |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,917,652 B2 | 7/2005 | Lyu |
| 6,944,621 B1 | 9/2005 | Collart |
| 6,944,629 B1 | 9/2005 | Shioi et al. |
| 6,956,901 B2 | 10/2005 | Boroczky et al. |
| 6,965,724 B1 | 11/2005 | Boccon-Gibod et al. |
| 6,965,993 B2 | 11/2005 | Baker |
| 6,985,588 B1 | 1/2006 | Glick et al. |
| 6,988,144 B1 | 1/2006 | Luken et al. |
| 7,007,170 B2 | 2/2006 | Morten |
| 7,023,924 B1 | 4/2006 | Keller et al. |
| 7,043,473 B1 | 5/2006 | Rassool et al. |
| 7,127,155 B2 | 10/2006 | Ando et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,197,234 B1 | 3/2007 | Chatterton |
| 7,209,892 B1 | 4/2007 | Galuten et al. |
| 7,231,132 B1 | 6/2007 | Davenport |
| 7,237,061 B1 | 6/2007 | Boic |
| 7,242,772 B1 | 7/2007 | Tehranchi |
| 7,328,345 B2 | 2/2008 | Morten et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,356,143 B2 | 4/2008 | Morten |
| 7,356,245 B2 | 4/2008 | Belknap et al. |
| 7,366,788 B2 | 4/2008 | Jones et al. |
| 7,376,831 B2 | 5/2008 | Kollmyer et al. |
| 7,406,174 B2 | 7/2008 | Palmer |
| 7,421,411 B2 | 9/2008 | Kontio et al. |
| 7,457,359 B2 | 11/2008 | Mabey et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,938 B2 | 3/2009 | Collart |
| 7,526,450 B2 | 4/2009 | Hughes et al. |
| 7,594,271 B2 | 9/2009 | Zhuk et al. |
| 7,610,365 B1 | 10/2009 | Kraft et al. |
| 7,640,435 B2 | 12/2009 | Morten |
| 7,689,510 B2 | 3/2010 | Lamkin et al. |
| 7,720,352 B2 | 5/2010 | Belknap et al. |
| 7,747,853 B2 | 6/2010 | Candelore et al. |
| 7,761,892 B2 | 7/2010 | Ellis et al. |
| 7,779,097 B2 | 8/2010 | Lamkin et al. |
| 7,817,608 B2 | 10/2010 | Rassool et al. |
| 7,869,691 B2 | 1/2011 | Kelly et al. |
| 7,962,942 B1 | 6/2011 | Craner |
| 7,974,714 B2 | 7/2011 | Hoffberg |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |

(56) References Cited

U.S. PATENT DOCUMENTS

| | | |
|---|---|---|
| 8,065,708 B1 | 11/2011 | Smyth et al. |
| 8,069,260 B2 | 11/2011 | Speicher et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1 | 10/2012 | Peacock |
| 8,296,434 B1 | 10/2012 | Miller et al. |
| 8,311,111 B2 | 11/2012 | Xu et al. |
| 8,311,115 B2 | 11/2012 | Gu et al. |
| 8,321,556 B1 | 11/2012 | Chatterjee et al. |
| 8,386,621 B2 | 2/2013 | Park |
| 8,401,900 B2 | 3/2013 | Cansler et al. |
| 8,412,841 B1 | 4/2013 | Swaminathan et al. |
| 8,452,110 B2 | 5/2013 | Shoham et al. |
| 8,456,380 B2 | 6/2013 | Pagan |
| 8,472,792 B2 | 6/2013 | Butt et al. |
| 8,473,630 B1 | 6/2013 | Galligan |
| 8,510,303 B2 | 8/2013 | Soroushian et al. |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,595,378 B1 | 11/2013 | Cohn et al. |
| 8,606,069 B2 | 12/2013 | Okubo et al. |
| 8,640,166 B1 | 1/2014 | Craner et al. |
| 8,681,866 B1 | 3/2014 | Jia |
| 8,726,264 B1 | 5/2014 | Allen et al. |
| RE45,052 E | 7/2014 | Li Adam |
| 8,774,609 B2 | 7/2014 | Drake et al. |
| 8,781,122 B2 | 7/2014 | Chan et al. |
| 8,787,570 B2 | 7/2014 | Braness et al. |
| 8,805,109 B2 | 8/2014 | Shoham et al. |
| 8,806,188 B2 | 8/2014 | Braness et al. |
| 8,843,586 B2 | 9/2014 | Pantos et al. |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,636 B2 | 12/2014 | Kiefer |
| 8,918,908 B2 | 12/2014 | Ziskind et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,025,659 B2 | 5/2015 | Soroushian et al. |
| 9,042,670 B2 | 5/2015 | Carmel et al. |
| 9,094,737 B2 | 7/2015 | Shivadas et al. |
| 9,191,457 B2 | 11/2015 | Van der Schaar |
| 9,197,685 B2 | 11/2015 | Soroushian |
| 9,210,481 B2 | 12/2015 | Braness et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,264,475 B2 | 2/2016 | Shivadas et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,391,866 B1 * | 7/2016 | Martin ............... H04L 41/0681 |
| 9,509,742 B2 * | 11/2016 | Gordon ............ H04N 21/23439 |
| 9,883,204 B2 | 1/2018 | Braness et al. |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2002/0026560 A1 | 2/2002 | Jordan et al. |
| 2002/0034252 A1 | 3/2002 | Owen et al. |
| 2002/0051494 A1 | 5/2002 | Yamaguchi et al. |
| 2002/0057898 A1 | 5/2002 | Normile |
| 2002/0059170 A1 | 5/2002 | Vange et al. |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0110193 A1 | 8/2002 | Yoo et al. |
| 2002/0116481 A1 | 8/2002 | Lee |
| 2002/0118953 A1 | 8/2002 | Kim |
| 2002/0120934 A1 | 8/2002 | Abrahams et al. |
| 2002/0136298 A1 | 9/2002 | Anantharamu et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0161462 A1 | 10/2002 | Fay |
| 2002/0180929 A1 | 12/2002 | Tseng et al. |
| 2002/0184159 A1 | 12/2002 | Tadayon et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 | 2/2003 | Wee et al. |
| 2003/0061305 A1 | 3/2003 | Copley et al. |
| 2003/0061369 A1 | 3/2003 | Aksu et al. |
| 2003/0065777 A1 | 4/2003 | Mattila et al. |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0006701 A1 | 1/2004 | Kresina |
| 2004/0021684 A1 | 2/2004 | Millner |
| 2004/0024688 A1 | 2/2004 | Bi et al. |
| 2004/0025180 A1 | 2/2004 | Begeja et al. |
| 2004/0031058 A1 | 2/2004 | Reisman |
| 2004/0039916 A1 | 2/2004 | Aldis et al. |
| 2004/0047614 A1 | 3/2004 | Green |
| 2004/0052501 A1 | 3/2004 | Tam |
| 2004/0071453 A1 | 4/2004 | Valderas |
| 2004/0081333 A1 | 4/2004 | Grab et al. |
| 2004/0081434 A1 | 4/2004 | Jung et al. |
| 2004/0088412 A1 | 5/2004 | John et al. |
| 2004/0093618 A1 | 5/2004 | Baldwin et al. |
| 2004/0105549 A1 | 6/2004 | Suzuki et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0158878 A1 | 8/2004 | Ratnakar et al. |
| 2004/0184534 A1 | 9/2004 | Wang |
| 2004/0202320 A1 | 10/2004 | Amini et al. |
| 2004/0217971 A1 | 11/2004 | Kim |
| 2004/0255115 A1 | 12/2004 | DeMello et al. |
| 2004/0255236 A1 | 12/2004 | Collart |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0055435 A1 | 3/2005 | Gbadegesin et al. |
| 2005/0071280 A1 | 3/2005 | Irwin et al. |

(56) References Cited

U.S. PATENT DOCUMENTS

| | | |
|---|---|---|
| 2005/0071469 A1 | 3/2005 | McCollom et al. |
| 2005/0108320 A1 | 5/2005 | Lord et al. |
| 2005/0114896 A1 | 5/2005 | Hug |
| 2005/0149450 A1 | 7/2005 | Stefik et al. |
| 2005/0180641 A1 | 8/2005 | Clark |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0254508 A1 | 11/2005 | Aksu et al. |
| 2005/0273695 A1 | 12/2005 | Schnurr |
| 2005/0275656 A1 | 12/2005 | Corbin et al. |
| 2006/0026294 A1 | 2/2006 | Virdi et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0093320 A1 | 5/2006 | Hallberg et al. |
| 2006/0120378 A1 | 6/2006 | Usuki et al. |
| 2006/0129909 A1 | 6/2006 | Butt et al. |
| 2006/0156330 A1 | 7/2006 | Chiu |
| 2006/0168639 A1 | 7/2006 | Gan et al. |
| 2006/0173887 A1 | 8/2006 | Breitfeld et al. |
| 2006/0179239 A1 | 8/2006 | Fluhr |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0031110 A1 | 2/2007 | Rijckaert |
| 2007/0044010 A1 | 2/2007 | Sull et al. |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0174209 A1 | 7/2007 | Fallon et al. |
| 2007/0178933 A1 | 8/2007 | Nelson |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0217339 A1 | 9/2007 | Zhao |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0271317 A1 | 11/2007 | Carmel et al. |
| 2007/0271385 A1 | 11/2007 | Davis et al. |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008455 A1 | 1/2008 | De Lange et al. |
| 2008/0043832 A1 | 2/2008 | Barkley et al. |
| 2008/0066099 A1 | 3/2008 | Brodersen et al. |
| 2008/0066181 A1 | 3/2008 | Haveson et al. |
| 2008/0086456 A1 | 4/2008 | Rasanen et al. |
| 2008/0086747 A1 | 4/2008 | Rasanen et al. |
| 2008/0101466 A1 | 5/2008 | Swenson et al. |
| 2008/0104633 A1 | 5/2008 | Noblecourt et al. |
| 2008/0114891 A1 | 5/2008 | Pereira |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0126248 A1 | 5/2008 | Lee et al. |
| 2008/0137541 A1 | 6/2008 | Agarwal et al. |
| 2008/0137736 A1 | 6/2008 | Richardson et al. |
| 2008/0151817 A1 | 6/2008 | Fitchett |
| 2008/0155061 A1 | 6/2008 | Afergan et al. |
| 2008/0172441 A1 | 7/2008 | Speicher et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |
| 2008/0195744 A1 | 8/2008 | Bowra et al. |
| 2008/0205860 A1 | 8/2008 | Holtman |
| 2008/0240144 A1 | 10/2008 | Kruse et al. |
| 2008/0256105 A1 | 10/2008 | Nogawa et al. |
| 2008/0260028 A1 | 10/2008 | Lamy-Bergot et al. |
| 2008/0262824 A1* | 10/2008 | Oslake ............... G06F 8/20 703/22 |
| 2008/0263354 A1 | 10/2008 | Beuque et al. |
| 2008/0279535 A1 | 11/2008 | Hague et al. |
| 2008/0294453 A1 | 11/2008 | Baird-Smith et al. |
| 2008/0298358 A1 | 12/2008 | John et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0168795 A1 | 7/2009 | Segel et al. |
| 2009/0169181 A1 | 7/2009 | Priyadarshi et al. |
| 2009/0172167 A1 | 7/2009 | Drai et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0290706 A1 | 11/2009 | Amini et al. |
| 2009/0290708 A1 | 11/2009 | Schneider et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0036954 A1 | 2/2010 | Sakata et al. |
| 2010/0040351 A1 | 2/2010 | Toma et al. |
| 2010/0057928 A1 | 3/2010 | Kapoor et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142917 A1 | 6/2010 | Isaji |
| 2010/0158109 A1 | 6/2010 | Dahlby et al. |

(56) References Cited

U.S. PATENT DOCUMENTS

| | | |
|---|---|---|
| 2010/0161825 A1 | 6/2010 | Ronca et al. |
| 2010/0166060 A1 | 7/2010 | Ezure et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0250532 A1 | 9/2010 | Soroushian et al. |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1 | 1/2011 | Yang et al. |
| 2011/0016225 A1 | 1/2011 | Park et al. |
| 2011/0047209 A1 | 2/2011 | Lindholm et al. |
| 2011/0055585 A1 | 3/2011 | Lee |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1 | 6/2011 | Rimac et al. |
| 2011/0184738 A1 | 7/2011 | Kalisky et al. |
| 2011/0191439 A1 | 8/2011 | Dazzi et al. |
| 2011/0191587 A1 | 8/2011 | Tian et al. |
| 2011/0191803 A1 | 8/2011 | Baldwin et al. |
| 2011/0197237 A1 | 8/2011 | Turner |
| 2011/0197238 A1 | 8/2011 | Li et al. |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0276695 A1 | 11/2011 | Maldaner et al. |
| 2011/0283012 A1 | 11/2011 | Melnyk |
| 2011/0291723 A1 | 12/2011 | Hashimoto |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon |
| 2012/0005368 A1 | 1/2012 | Knittle et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0066360 A1 | 3/2012 | Ghosh |
| 2012/0093214 A1 | 4/2012 | Urbach |
| 2012/0114302 A1 | 5/2012 | Randall |
| 2012/0124191 A1 | 5/2012 | Lyon |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0166633 A1 | 6/2012 | Baumback et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma et al. |
| 2012/0254455 A1 | 10/2012 | Adimatyam et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1 | 12/2012 | Biderman et al. |
| 2012/0314778 A1 | 12/2012 | Salustri et al. |
| 2012/0317235 A1 | 12/2012 | Nguyen et al. |
| 2013/0007223 A1 | 1/2013 | Luby et al. |
| 2013/0013730 A1 | 1/2013 | Li et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0055084 A1 | 2/2013 | Soroushian et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0080772 A1 | 3/2013 | McGowan et al. |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0128962 A1 | 5/2013 | Rajagopalan et al. |
| 2013/0152767 A1 | 6/2013 | Katz et al. |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1 | 8/2013 | Butler et al. |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227122 A1 | 8/2013 | Gao |
| 2013/0227573 A1* | 8/2013 | Morsi ............... G06F 9/5083 718/100 |
| 2013/0290697 A1 | 10/2013 | Wang et al. |
| 2013/0301424 A1 | 11/2013 | Kotecha et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0013103 A1 | 1/2014 | Giladi et al. |
| 2014/0037620 A1 | 2/2014 | Ferree et al. |
| 2014/0047069 A1 | 2/2014 | Ma et al. |
| 2014/0052823 A1 | 2/2014 | Gavade et al. |
| 2014/0059156 A1 | 2/2014 | Freeman, II et al. |
| 2014/0101445 A1 | 4/2014 | Giladi et al. |
| 2014/0101722 A1 | 4/2014 | Moore |
| 2014/0119432 A1 | 5/2014 | Wang et al. |
| 2014/0122698 A1 | 5/2014 | Batrouni et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |
| 2014/0164584 A1 | 6/2014 | Joe et al. |

(56) References Cited

U.S. PATENT DOCUMENTS

| | | | |
|---|---|---|---|
| 2014/0177734 A1 | 6/2014 | Carmel et al. | |
| 2014/0189065 A1 | 7/2014 | van der Schaar et al. | |
| 2014/0195686 A1 | 7/2014 | Yeager et al. | |
| 2014/0201382 A1 | 7/2014 | Shivadas et al. | |
| 2014/0211840 A1 | 7/2014 | Butt et al. | |
| 2014/0211859 A1 | 7/2014 | Carmel et al. | |
| 2014/0241420 A1 | 8/2014 | Orton-jay et al. | |
| 2014/0241421 A1 | 8/2014 | Orton-jay et al. | |
| 2014/0250473 A1 | 9/2014 | Braness et al. | |
| 2014/0258714 A1 | 9/2014 | Grab | |
| 2014/0269269 A1 | 9/2014 | Kovvali et al. | |
| 2014/0269927 A1 | 9/2014 | Naletov et al. | |
| 2014/0269936 A1 | 9/2014 | Shivadas et al. | |
| 2014/0280763 A1 | 9/2014 | Grab et al. | |
| 2014/0297804 A1 | 10/2014 | Shivadas et al. | |
| 2014/0297881 A1 | 10/2014 | Shivadas et al. | |
| 2014/0355668 A1 | 12/2014 | Shoham et al. | |
| 2014/0355958 A1 | 12/2014 | Soroushian et al. | |
| 2014/0359678 A1 | 12/2014 | Shivadas et al. | |
| 2014/0359679 A1 | 12/2014 | Shivadas et al. | |
| 2014/0359680 A1 | 12/2014 | Shivadas et al. | |
| 2014/0376720 A1 | 12/2014 | Chan et al. | |
| 2015/0006662 A1 | 1/2015 | Braness | |
| 2015/0026677 A1 | 1/2015 | Stevens et al. | |
| 2015/0049957 A1 | 2/2015 | Shoham et al. | |
| 2015/0058228 A1* | 2/2015 | Voeller | G06Q 10/06313 705/301 |
| 2015/0063693 A1 | 3/2015 | Carmel et al. | |
| 2015/0067715 A1 | 3/2015 | Koat et al. | |
| 2015/0104153 A1 | 4/2015 | Braness et al. | |
| 2015/0117836 A1 | 4/2015 | Amidei et al. | |
| 2015/0117837 A1 | 4/2015 | Amidei et al. | |
| 2015/0139419 A1 | 5/2015 | Kiefer et al. | |
| 2015/0188758 A1 | 7/2015 | Amidei et al. | |
| 2015/0188842 A1 | 7/2015 | Amidei et al. | |
| 2015/0188921 A1 | 7/2015 | Amidei et al. | |
| 2015/0189017 A1 | 7/2015 | Amidei et al. | |
| 2015/0189373 A1 | 7/2015 | Amidei et al. | |
| 2015/0195259 A1 | 7/2015 | Liu et al. | |
| 2015/0334435 A1 | 11/2015 | Shivadas et al. | |
| 2016/0072870 A1 | 3/2016 | Watson et al. | |
| 2016/0127440 A1* | 5/2016 | Gordon | H04N 21/23439 709/219 |
| 2016/0149981 A1 | 5/2016 | Shivadas et al. | |
| 2016/0219303 A1 | 7/2016 | Braness et al. | |
| 2017/0026712 A1 | 1/2017 | Gonder et al. | |
| 2017/0041604 A1 | 2/2017 | Soroushian et al. | |

FOREIGN PATENT DOCUMENTS

| | | |
|---|---|---|
| CN | 1723696 | 1/2006 |
| CN | 110268694 A | 9/2019 |
| EP | 757484 A2 | 2/1997 |
| EP | 813167 A2 | 12/1997 |
| EP | 0936812 A1 | 8/1999 |
| EP | 1056273 A2 | 11/2000 |
| EP | 1420580 A1 | 5/2004 |
| EP | 1553779 A1 | 7/2005 |
| EP | 1657835 A1 | 5/2006 |
| EP | 1718074 A1 | 11/2006 |
| EP | 2486517 A1 | 8/2012 |
| EP | 2486727 A1 | 8/2012 |
| EP | 2507995 A1 | 10/2012 |
| EP | 2564354 A1 | 3/2013 |
| EP | 2616991 | 7/2013 |
| EP | 2617192 | 7/2013 |
| EP | 2661696 A1 | 11/2013 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2716048 A1 | 4/2014 |
| EP | 2721826 A1 | 4/2014 |
| EP | 2486517 | 6/2014 |
| EP | 2751990 | 7/2014 |
| EP | 2807821 | 12/2014 |
| EP | 2751990 A4 | 4/2015 |
| EP | 2972960 A1 | 1/2016 |
| EP | 2972960 B1 | 9/2019 |
| JP | 08046902 A | 2/1996 |
| JP | 08111842 A | 4/1996 |
| JP | 08163488 A | 6/1996 |
| JP | 08287613 A | 11/1996 |
| JP | 09037225 A | 2/1997 |
| JP | 11164307 A | 6/1999 |
| JP | 11275576 A | 10/1999 |
| JP | 11328929 A | 11/1999 |
| JP | 2000201343 A | 7/2000 |
| JP | 02001043668 A | 2/2001 |
| JP | 2001346165 A | 12/2001 |
| JP | 2002170363 | 6/2002 |
| JP | 2002518898 A | 6/2002 |
| JP | 2002218384 A | 8/2002 |
| JP | 2003250113 A | 9/2003 |
| JP | 2004013823 A | 1/2004 |
| JP | 2004515941 A | 5/2004 |
| JP | 2004172830 A | 6/2004 |
| JP | 2004187161 A | 7/2004 |
| JP | 2004234128 A | 8/2004 |
| JP | 2005027153 | 1/2005 |
| JP | 2005080204 A | 3/2005 |
| JP | 2006524007 A | 10/2006 |
| JP | 2007036666 A | 2/2007 |
| JP | 2007174375 | 7/2007 |
| JP | 2007235690 A | 9/2007 |
| JP | 2007535881 A | 12/2007 |
| JP | 2008235999 A | 10/2008 |
| JP | 2014506430 A | 3/2014 |
| JP | 6038805 B2 | 12/2016 |
| JP | 2017063453 | 3/2017 |
| KR | 100221423 B1 | 9/1999 |
| KR | 2002013664 | 2/2002 |
| KR | 1020020064888 A | 8/2002 |
| KR | 100669616 B1 | 1/2007 |
| KR | 1020130133830 | 12/2013 |
| WO | 1995015660 A1 | 6/1995 |
| WO | 1996013121 | 5/1996 |
| WO | 1997031445 A3 | 4/1998 |
| WO | 1999010836 A1 | 3/1999 |
| WO | 1999065239 A2 | 12/1999 |
| WO | 2001031497 A1 | 5/2001 |
| WO | 2001050732 A2 | 7/2001 |
| WO | 2001065762 A2 | 9/2001 |
| WO | 2002001880 A1 | 1/2002 |
| WO | 2002008948 A2 | 1/2002 |
| WO | 2002035832 A2 | 5/2002 |
| WO | 2002037210 A2 | 5/2002 |
| WO | 2002054196 A2 | 7/2002 |
| WO | 2004054247 A1 | 6/2004 |
| WO | 2004097811 A1 | 11/2004 |
| WO | 2004102571 A1 | 11/2004 |
| WO | 2006018843 A2 | 2/2006 |
| WO | 2006018843 A3 | 12/2006 |
| WO | 2007044590 A2 | 4/2007 |
| WO | 2007113836 A2 | 10/2007 |
| WO | 2008010275 A1 | 1/2008 |
| WO | 2008042242 A2 | 4/2008 |
| WO | 2007113836 A3 | 11/2008 |
| WO | 2007113836 B1 | 12/2008 |
| WO | 2009065137 A1 | 5/2009 |
| WO | 2010060106 A1 | 5/2010 |
| WO | 2010080911 A1 | 7/2010 |
| WO | 2010089962 A1 | 8/2010 |
| WO | 2010122447 A1 | 10/2010 |
| WO | 2010147878 A1 | 12/2010 |
| WO | 2011042898 A1 | 4/2011 |
| WO | 2011042900 A1 | 4/2011 |
| WO | 2011068668 A1 | 6/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |

(56) References Cited

FOREIGN PATENT DOCUMENTS

| | | |
|---|---|---|
| WO | 2012035534 A3 | 7/2012 |
| WO | 2012094171 A1 | 7/2012 |
| WO | 20120094181 A2 | 7/2012 |
| WO | 20120094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013032518 A2 | 3/2013 |
| WO | 2013103986 A2 | 7/2013 |
| WO | 2013111126 A2 | 8/2013 |
| WO | 2013032518 A3 | 9/2013 |
| WO | 2013144942 A1 | 10/2013 |
| WO | 2014063726 A1 | 5/2014 |
| WO | 2014145901 A1 | 9/2014 |
| WO | 2014193996 A2 | 12/2014 |
| WO | 2014193996 A3 | 2/2015 |
| WO | 2015031982 A1 | 3/2015 |
| WO | 2013111126 A3 | 6/2015 |
| WO | 2018152347 A1 | 8/2018 |

OTHER PUBLICATIONS

"Information Technology-Coding of Audio Visual Objects—Part 2: Visual" International Standard, ISO/IEC 14496-2, Third Edition, Jun. 1, 2004, pp. 1-724. (presented in three parts).
Broadq—The Ultimate Home Entertainment Software, printed May 11, 2009 from ittp://web.srchive.org/web/20030401122010/www.broadq.com/qcasttuner/, 1 page.
Cloakware Corporation, "Protecting Digital Content Using Cloakware Code Transformation Technology", Version 1.2, May 2002, 10 pgs.
European Search Report Application No. EP 08870152, Search Completed May 19, 2011, dated May 26, 2011, 9 pgs.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Extended European Search Report for European Application EP10821672, completed Jan. 30, 2014, 3 pgs.
Extended European Search Report for European Application EP11824682, completed Feb. 6, 2014, 4 pgs.
Extended European Search Report for European Application No. 14763140.2, Search completed Sep. 26, 2016, dated Oct. 5, 2016, 9 pgs.
Federal Computer Week, "Tool Speeds Info to Vehicles", Jul. 25, 1999, 5 pgs.
HTTP Live Streaming Overview, Networking & Internet, Apple, Inc., Apr. 1, 2011, 38 pgs.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
InformationWeek, "Internet on Wheels", InformationWeek: Front End: Daily Dose, Jul. 20, 1999, Printed on Mar. 26, 2014, 3 pgs.
International Preliminary Report for Application No. PCT/US2011/066927, Filed Dec. 22, 2011, Report dated Jul. 10, 2013, 13 pgs.
International Preliminary Report on Patentability for International Application PCT/US14/30747, Report dated Sep. 15, 2015, dated Sep. 24, 2015, 6 pgs.
International Preliminary Report on Patentability for International Application No. PCT/US2008/083816, dated May 18, 2010, 6 pgs.
International Preliminary Report on Patentability for International Application No. PCT/US2011/068276, dated Mar. 4, 2014, 23 pgs.
International Preliminary Report on Patentability for International Application PCT/US2013/043181, dated Dec. 31, 2014, dated Jan. 8, 2015, 11 pgs.

International Preliminary Report on Patentability for International Application PCT/US2014/039852, dated Dec. 1, 2015, dated Dec. 5, 2015, 8 pgs.
International Search Report and Written Opinion for International Application No. PCT/US07/63950, completed Feb. 19, 2008; dated Mar. 19, 2008, 9 pgs.
International Search Report and Written Opinion for International Application No. PCT/US08/87999, completed Feb. 7, 2009, dated Mar. 19, 2009, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2005/025845, completed Feb. 5, 2007 and dated May 10, 2007, 8 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/020372, Completed Feb. 10, 2009, dated Mar. 1, 2010, 7 pgs.
International Search Report and Written Opinion for International Application No. PCT/US2010/56733, Completed Jan. 3, 2011, dated Jan. 14, 2011, 9 pgs.
International Search Report and Written Opinion for International Application No. PCT/US2013/043181, completed Nov. 27, 2013, dated Dec. 6, 2013, 12 pgs.
International Search Report and Written Opinion for International Application No. PCT/US2018/018399, Search completed Apr. 4, 2018, dated Apr. 25, 2018, 28 pgs.
International Search Report and Written Opinion for International Application PCT/US14/30747, completed Jul. 30, 2014, dated Aug. 22, 2014, 7 pgs.
International Search Report and Written Opinion for International Application PCT/US14/39852, completed Oct. 21, 2014, dated Dec. 5, 2014, 11 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2011/068276, completed Jun. 19, 2013, dated Jul. 8, 2013, 24 pgs.
International Search Report and Written Opinion for PCT/US2013/020572, International Filing Date Jan. 7, 2013, Search Completed Mar. 19, 2013, dated Apr. 29, 2013, 10 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Lifehacker—Boxqueue Bookmarklet Saves Videos for Later Boxee Watching, printed Jun. 16, 2009 from http://feeds.gawker.com/~r/lifehacker/full/~3/OHvDmrIgZZc/boxqueue-bookmarklet-saves-videos-for-late-boxee-watching, 2 pgs.
LinksysWireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Adhikari et al., "Unreeling Netflix: Understanding and Improving Multi-CDN Movie Delivery", INFOCOM, 2012 Proceedings IEEE, 2012, 9 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, 9 pgs.

(56) References Cited

OTHER PUBLICATIONS

Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., printed Jan. 24, 2007, USA, 15 pgs.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown), 6 pgs.
Author Unknown, "Turbo-Charge Your Internet and PC Performance", printed Oct. 30, 2008 from Speedtest.net—The Global Broadband Speed Test, 1 page.
Author Unknown, "White paper, The New Mainstream Wireless LAN Standard", Broadcom Corporation, Jul. 2003, 12 pgs.
Blasiak, "Video Transrating and Transcoding: Overview of Video Transrating and Transcoding Technologies", Ingenient Technologies, TI Developer Conference, Aug. 6-8, 2002, 22 pgs.
Casares et al., "Simplifying Video Editing Using Metadata", DIS2002, 2002, 10 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Gannes, "The Lowdown on Apple's HTTP Adaptive Bitrate Streaming", GigaOM, Jun. 10, 2009, 12 pgs.
Garg et al., "An Experimental Study of Throughput for UDP and VoIP Traffic in IEEE 802.11b Networks", Wireless Communications and Networkings, Mar. 2003, pp. 1748-1753.
Gast, "When is 54 Not Equal to 54? A Look at 802.11a, b and g Throughput", Aug. 8, 2003, printed Oct. 30, 2008 from www.oreillynet.com/pub/a/wireless/2003/08/08/wireless_throughput.html, 4 pgs.
Ghosh, "Enhancing Silverlight Video Experiences with Contextual Data", Retrieved from: http://msdn.microsoft.com/en-us/magazine/ee336025.aspx, 2010,15 pgs.
Griffith, Eric "The Wireless Digital Picture Frame Arrives", W-Fi Planet, printed May 4, 2007 from http://www.wi-fiplanet.com/news/article.php/3093141, Oct. 16, 2003, 3 pgs.
Inlet Technologies, "Adaptive Delivery to iDevices", 2010, 2 pgs.
Inlet Technologies, "Adaptive delivery to iPhone 3.0", 2009, 2 pgs.
Inlet Technologies, "HTTP versus RTMP", 2009, 3 pgs.
Inlet Technologies, "The World's First Live Smooth Streaming Event: The French Open", 2009, 2 pgs.
I-O Data, "Innovation of technology arrived", Nov. 2004, Retrieved from http://www.iodata.com/catalogs/AVLP2DVDLA_Flyer200505.pdf, 2 pgs.
Kaspar et al., "Using HTTP Pipelining to Improve Progressive Download over Multiple Heterogeneous Interfaces", IEEE ICC proceedings, 2010, 5 pgs.
Kim, Kyuheon "MPEG-2 ES/PES/TS/PSI", Kyung-Hee University, Oct. 4, 2010, 66 pgs.
Kozintsev et al., "Improving last-hop multicast streaming video over 802.11", Workshop on Broadband Wireless Multimedia, Oct. 2004, 10 pgs.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.

Long et al., "Silver: Simplifying Video Editing with Metadata", Demonstrations, CHI 2003: New Horizons, Apr. 5-10, 2003, pp. 628-629.
Martin et al, "Characterizing Netflix Bandwidth Consumption", In CCNC, 2013, 6 pgs.
Martin et al, "Characterizing Netflix Bandwidth Consumption", Presented at IEEE CCNC 2013 on Jan. 13, 2013, 21 pgs.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
MSDN, "Adaptive streaming, Expression Studio 2.0", Apr. 23, 2009, 2 pgs.
Nelson, "Smooth Streaming Deployment Guide", Microsoft Expression Encoder, Aug. 2010, 66 pgs.
Nelson, Mark "Arithmetic Coding+Statistical Modeling=Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.
Nelson, Michael "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pgs.
Noboru, "Play Fast and Fine Video on Web! codec", Co.9 No. 12, Dec. 1, 2003, 2 pgs.
Noe, A. "Matroska File Format (under construction!)", Retrieved from the Internet: URL:http://web.archive.org web/20070821155146/www.matroska.org/technical/specs/matroska.pdf [retrieved on Jan. 19, 2011], Jun. 24, 2007, 26 pgs.
Linksys®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p, 3 pgs.
Microsoft Corporation, "Chapter 8, Multimedia File Formats" 1991, Microsoft Windows Multimedia Programmer's Reference, 20 pgs.
Microsoft Media Platform: Player Framework, "Microsoft Media Platform: Player Framework v2.5 (formerly Silverlight Media Framework)", May 3, 2011, 2 pgs.
Microsoft Media Platform: Player Framework, "Silverlight Media Framework v1.1", Jan. 2010, 2 pgs.
Microsoft Windows® XP Media Center Edition 2005, Frequently asked Questions, printed May 4, 2007 from http://www.microsoft.com/windowsxp/mediacenter/evaluation/faq.mspx, 6 pgs.
Microsoft Windows® XP Media Center Edition 2005: Features, printed May 9, 2007, from http://www.microsoft.com/windowsxp/mediacenter/evaluation/features.mspx, 4 pgs.
Office Action for Chinese Patent Application No. CN200880127596.4, dated May 6, 2014, 8 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Open DML AVI-M-JPEG File Format Subcommittee, "Open DML AVI File Format Extensions", Version 1.02, Feb. 28, 1996, 29 pgs.
PC world.com, Future Gear: PC on the HiFi, and the TV, from http://www.pcworld.com/article/id,108818-page,1/article.html, printed May 4, 2007, from IDG Networks, 2 pgs.
Qtv—About BroadQ, printed May 11, 2009 from http://www.broadq.com/en/about.php, 1 page.
Supplementary European Search Report for Application No. EP 04813918, Search Completed Dec. 19, 2012, 3 pgs.
Supplementary European Search Report for Application No. EP 10729513, completed Dec. 9, 2013, 4 pgs.
Supplementary European Search Report for EP Application 11774529, completed Jan. 31, 2014, 2 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.

(56) References Cited

OTHER PUBLICATIONS

Invitation to Pay Add'l Fees Rcvd for International Application PCT/US14/39852, Mailed Sep. 25, Sep. 25, 2014, 2 pgs.
"Adaptive Streaming Comparison", Jan. 28, 2010, 5 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"Diagram | Matroska", Dec. 17, 2010, Retrieved from http://web.archive.org/web/201 01217114656/http:I/matroska.org/technical/diagram/index.html on Jan. 29, 2016, Dec. 17, 2010, 5 pgs.
"DVD—MPeg differences", printed Jul. 2, 2009 from http://dvd.sourceforge.net/dvdinfo/dvdmpeg.html, 1 page.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6 pgs.
"Information Technology—Coding of audio-visual objects—Part 17: Streaming text", International Organisation for Standardisation, Feb. 2004, 22 pgs.
"Information Technology—Coding of audio-visual objects—Part 18: Font compression and streaming", ISO/IEC 14496-18, First edition Jul. 1, 2004, 26 pgs.
"KISS Players, KISS DP-500", retrieved from http://www.kiss-technology.com/?p=dp500 on May 4, 2007, 1 page.
"Matroska Streaming | Matroska", Retrieved from the Internet: URL:http://web.archive.org/web/201 0121711431 O/http://matroska.org/technical!streaming/index.html [retrieved on Jan. 29, 2016], Dec. 17, 2010, 2 pgs.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"OpenDML AVI File Format Extensions Version 1.02", OpenDML AVI MJPEG File Format Subcommittee. Last revision: Feb. 28, 1996. Reformatting: Sep. 1997, 56 pgs.
"QCast Tuner for PS2", printed May 11, 2009 from http://web.archive.org/web/20030210120605/www.divx.com/software/detail.php?ie=39, 2 pgs.
"Smooth Streaming Client", The Official Microsoft IIS Site, Sep. 24, 2010, 4 pgs.
"Specifications | Matroska", Retrieved from the Internet: URL:http://web.archive.org/web/201 00706041303/http:/1www.matroska.org/technical/specs/index.html [retrieved on Jan. 29, 2016, Jul. 6, 2010, 12 pgs.
"Supplementary European Search Report for Application No. EP 10834935", International Filing Date Nov. 15, 2010, Search Completed May 27, 2014, 9 pgs.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
U.S. Appl. No. 13/224,298, "Final Office Action Received", dated May 19, 2014, 26 pgs.
U.S. Appl. No. 13/905,804, "Non-Final Office Action Received",
U.S. Appl. No. 13/905,804, "Non-Final Office Action Received", dated Jul. 25, 2014, 15 pgs.
Noe, Alexander "AVI File Format", http://www.alexander-noe.com/video/documentation/avi.pdf, Dec. 14, 2006, 26 pgs.
Noe, Alexander "Definitions", Apr. 11, 2006, retrieved from http://www.alexander-noe.com/video/amg/definitions.html on Oct. 16, 2013, 2 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html, 7 pgs.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R "HTTP Live Streaming: draft-pantos-http-live-streaming-06", Published by the Internet Engineering Task Force (IETF), Mar. 31, 2011, 24 pgs.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H "Real Time Streaming Protocol 2.0 (RTSP): draft-ietfmmusic-rfc2326bis-27", MMUSIC Working Group of the Internet Engineering Task Force (IETF), Mar. 9, 2011, 296 pgs (presented in two parts).
Siglin, "HTTP Streaming: What You Need to Know", streamingmedia.com, 2010, 15 pgs.
Siglin, "Unifying Global Video Strategies, MP4 File Fragmentation for Broadcast, Mobile and Web Delivery", Nov. 16, 2011, 16 pgs.
Tan, Yap-Peng et al., "Video transcoding for fast forward/reverse video playback", IEEE ICIP, 2002, 4 pgs.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 page.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . On Mar. 6, 2006, 7 pgs.
Unknown, "Entropy and Source Coding (Compression)", TCOM 570, Sep. 1999, 22 pgs.
Unknown, "MPEG-4 Video Encoder: Based on International Standard ISO/IEC 14496-2", Patni Computer Systems, Ltd., publication date unknown, 15 pgs.

(56) References Cited

OTHER PUBLICATIONS

Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", In China Communications, Oct. 2006, pp. 30-44.
Zambelli, "IIS Smooth Streaming Technical Overview", Microsoft Corporation, Mar. 2009, 17 pgs.
Extended European Search Report for European Application EP19189160.5, Report Completed Sep. 19, 2019, dated Sep. 26, 2019, 7 pgs.

\* cited by examiner

SYSTEMS AND METHODS FOR ADAPTIVE SWITCHING BETWEEN MULTIPLE CONTENT DELIVERY NETWORKS DURING ADAPTIVE BITRATE STREAMING

FIELD OF THE INVENTION

The present invention generally relates to adaptive bitrate streaming systems, and more particularly to adaptive switching between multiple content delivery networks when performing adaptive bitrate streaming.

BACKGROUND

A growing segment of Internet use is media streaming, which allows consumers to consume media content directly from the Internet, bypassing many traditional methods of delivery. Streaming media describes the playback of media on a playback device, where the media is stored on a server and is sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth and CPU capacity) in real time and adjusting the bitrate of the streamed media accordingly. Typically, the source media is encoded at multiple bit rates and the playback device or client switches between streaming the different encodings depending on available resources.

Streams of content utilized in adaptive bitrate streaming systems are typically encoded at target bitrates. Target bitrates include an anticipated maximum bitrate that a user may obtain while streaming content. Streams are typically encoded in a non-uniform manner, but contain an average bitrate. Streams are also usually encoded where the stream has an average bitrate that approaches the maximum or target bitrate. These maximum bitrates therefore, are generally used to make stream switching decisions.

Streams utilized in adaptive bitrate streaming are typically segmented, which may include splitting the streams into short duration segments of equal duration in each of the alternative streams. The segments can be packaged in container files formatted in accordance with the requirements of the standards such as MPEG DASH or HLS. These segments can then be published to a HTTP server for distribution.

Recently, higher resolutions of video content are possible for viewing. "4K" content and televisions have become more commonplace in the consumer market. A 4K television contains four times the amount of pixels as a standard 1080P television set. Specifically, a 4K television has a resolution of 3,840×2,160 compared to the 1,920×1,080 resolution of 1080P sets.

Content delivery networks (CDNs) refer to a network of proxy severs deployed in different physical data centers at various points around the globe. A CDN can be utilized to provide increased performance and uptime for content delivery. This increased performance may be achieved by having multiple servers with copies of the same content across the globe. When a user attempts to access the content, a CDN that is physically closer or at least have a shorter digital route to take can deliver the content faster than a regular server farther away. In static streaming situations, this is ideal as the content that is streamed does not change. However, in live streaming situations, ideally latency is accounted for as the content is first encoded and then distributed to the CDN networks. Additionally, having multiple copies of the same content decreases the likelihood that content will be unavailable when one server goes offline or experiences heavy traffic that might otherwise impair the ability to deliver the content.

Content delivery networks are run by numerous companies including Akamai Technologies, Inc. of Cambridge Mass., and Amazon.com, Inc. of Seattle, Wash. CDN services can be hired by any company seeking to speed up and increase the uptime of their web offerings. Additionally, companies may utilize multiple CDNs to further increase their benefits.

SUMMARY OF THE INVENTION

Systems and methods for adaptive switching between multiple content delivery networks during adaptive bitrate streaming. In one embodiment, an adaptive content delivery network switching device includes a processor, a network interface, and a memory connected to the processor, where the memory contains a content delivery network switching application and, the content delivery network switching application directs the processor to receive content from a first content delivery network, determine a minimum performance threshold based on playback variables from the received content, receive new content from a second content delivery network if the minimum performance threshold is not satisfied.

In a further embodiment, the minimum performance threshold comprises satisfying a minimum buffer threshold.

In another embodiment, the buffer threshold is at least six seconds.

In a still further embodiment, the minimum performance threshold comprises satisfying a minimum playback bitrate threshold.

In still another embodiment, the minimum performance threshold is not satisfied if a HyperText Transfer Protocol (HTTP) 404 error is detected.

In a yet further embodiment, the minimum performance threshold is not satisfied if a HyperText Transfer Protocol (HTTP) error is detected.

In yet another embodiment, the new content received is at the same quality level.

In a further embodiment again, the content delivery network switching application further directs the processor to create a record of any content delivery network that encounters a HyperText Transfer Protocol (HTTP) error.

In another embodiment again, the content delivery network switching application further directs the processor to avoid receiving content from a second content delivery network from any content delivery network that is in the record of HyperText Transfer Protocol (HTTP) errors.

In a further additional embodiment, the memory also contains a media playback application that directs the processor to playback content.

In another additional embodiment, a method for adaptive content delivery network switching includes receiving content from a first content delivery network, determining a minimum performance threshold based on playback variables from the received content, receiving new content from a second content delivery network if the minimum performance threshold is not satisfied.

DETAILED DESCRIPTION OF THE DRAWINGS

Turning now to the drawings, systems and methods for performing adaptive bitrate streaming involving adaptive switching between multiple content delivery networks in accordance with various embodiments of the invention are illustrated. In several embodiments, many pieces of content are made available for streaming on multiple content delivery networks. Traditionally, once a certain CDN provider was selected to stream content from, only that CDN provider was utilized for the duration of the streaming of that content by a specific playback device. Adaptive CDN switching systems in accordance with many embodiments of the invention utilize playback devices configured to switch between multiple CDN providers during a streaming session. In several embodiments, the goal of the adaptive CDN switching system is to increase the overall quality level of the content received by playback devices, and/or to avoid an interruption in service. In certain embodiments, an adaptive CDN switching system may be operated in a manner that best utilizes the available bandwidth for all playback devices, allowing for an increased number of playback devices on the system or for a higher quality of streaming experience for those playback devices already on the system.

Many current streaming systems employ adaptive bitrate streaming. Adaptive bitrate streaming decisions are typically based upon the relationship between the current available bandwidth (i.e. network capacity at the playback device) and the maximum bitrate utilized in the encoding of the content. Playback devices utilized within adaptive CDN switching systems in accordance with many of the embodiments of the invention utilize information about the content of the media in addition to the current available bandwidth and the maximum bitrate utilized in the encoding of the content to make stream switching decisions.

While much of the discussion that follows relates to systems and methods that utilize adaptive switching between multiple content delivery networks during the streaming of video content, similar techniques can be utilized to perform adaptive CDN switching for a variety of data including programs, audio, web pages and/or interactive content. Accordingly, adaptive CDN switching systems should not be considered as limited to performing adaptive CDN switching only of video content. Systems and methods for performing adaptive CDN switching of content in accordance with various embodiments of the invention are discussed further below.

Adaptive CDN Switching Systems

Figure 1:
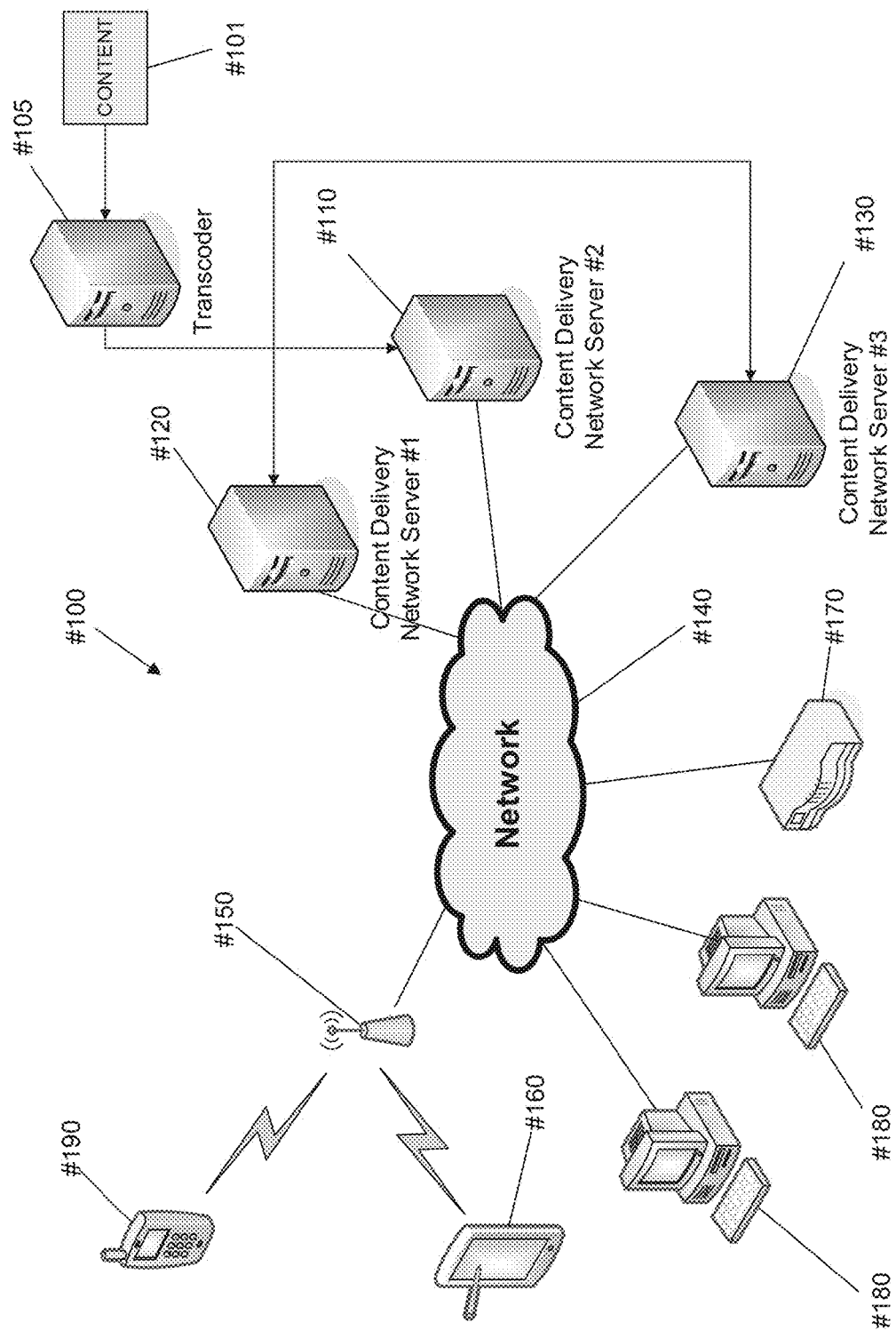
FIG. 1 is a network diagram of an adaptive CDN switching system in accordance with an embodiment of the invention.

An adaptive CDN switching system in accordance with an embodiment of the invention is illustrated in FIG. 1. The adaptive CDN switching system 100 begins with content 101 that is to be made available for streaming. The transcoder 105 processes the content into alternative streams and delivers the processed content to a first content delivery network server 110 that is connected to a network 140. A second content delivery network server 120 and a third content delivery network server 130 may also be connected to the network 140 and receive alternative streams from the transcoder 105. Additionally, the system includes a variety of playback devices that can communicate with the various content delivery networks via the network including (but not limited to) personal computers 180, stand-alone playback devices 170, mobile phones 190, and personal computing devices 160, some of which may connect to the network 140 via a wireless access point 150.

The adaptive CDN switching system 100 includes a transcoder 105 that receives content 101 for processing into alternative streams. In certain embodiments, this process can be done on the fly for live streaming situations which require short segments of content to be transcoded and delivered to the CDN networks for immediate distribution. The adaptive CDN switching system 100 also includes a first CDN server 110 configured to deliver content. In many instances, media content (such as, but not limited to, video) is encoded at different maximum bitrates and segmented into smaller portions. In some embodiments, the segments are stored in a single file which may be accessed through byte-range requests. In other embodiments, each content segment is stored in a separate file. In a number of embodiments, the content segments are conceptual and are simply blocks of content within a content stream. In the illustrated embodiment, the first CDN server is an HTTP server. In other embodiments, the first CDN server can be any processing device with sufficient resources to perform the processing and delivery of source media (including, but not limited to, video, audio, quality analysis, and/or subtitles). A variety of playback devices can request segments of the content from the first CDN server based on the manifest via a network 140 such as the Internet.

In many embodiments, the adaptive CDN switching system 100 includes a second CDN server 120 and third CDN server 130 configured similarly to the first CDN server 110. In a number of embodiments, the first, second, and third CDN servers are operated by different companies. In certain embodiments, the first CDN server 110 is distinct from the second 120 and third CDN servers 130 and/or may be located in a different data center. As can readily be appreciated, the specific location and distribution of the CDN servers is largely dependent upon the requirements of a given application.

A playback device may decode and present content for viewing. As can readily be appreciated, certain devices may implement a playback client application to stream content. In a number of embodiments, a playback device streams content via a network 140. In many embodiments, a playback device requests segments of content from a first CDN server 110 as defined in a manifest or other URL. In many embodiments, analytic data about the system may be stored for future use. For example, adaptive CDN switching analytics may be used to create any number of switching recommendations, buffering decisions, and/or source content preprocessing tasks. In many embodiments, an adaptive CDN switching system accumulates data concerning content segments selected for playback and can relocate and/or rebalance content segments to provide content that is more likely to achieve a desired quality at a given observed network bandwidth. As can readily be appreciated, the use of data collected by a CDN server or adaptive CDN switching player is logically only limited by the requirement of a given application. In the illustrated embodiment, the playback devices are represented by particular devices, but may also include (but are not limited to) consumer electronics, DVD players, Blu-Ray players, televisions, video-game consoles, tablets, and other devices that are capable of connecting to a server and playing back content.

While a variety of adaptive CDN switching systems are described above with reference to FIG. 1, the specific components utilized within an adaptive CDN switching system and the manner in which CDNs are selected for streaming based upon achieving a target quality or user experience at a given network bandwidth and/or processing resources are largely dependent upon the requirements of specific applications. Adaptive CDN switching playback devices that can be utilized in adaptive CDN switching systems in accordance with various embodiments of the invention are discussed further below.

Adaptive CDN Switching Playback Devices

Many embodiments of the invention utilize CDN servers to deliver content segments to stream content under different playback conditions. Such systems rely upon a playback device that simply requests content indicated in a quality based manifest or in URLs based upon the measured playback conditions. In a number of embodiments, however, the playback device evaluates local playback conditions and searches out alternative CDN providers from which to download segments. These players then utilize the locally stored data regarding playback conditions and bandwidth conditions to determine the CDN from which to request subsequent content segments. These CDN switching decisions may be determined not only by requesting segments that achieve a certain bitrate, but can also be formatted to increase the overall performance of the network allowing for more users to access the content and/or to increase the selected quality of the content being streamed.

Figure 2:
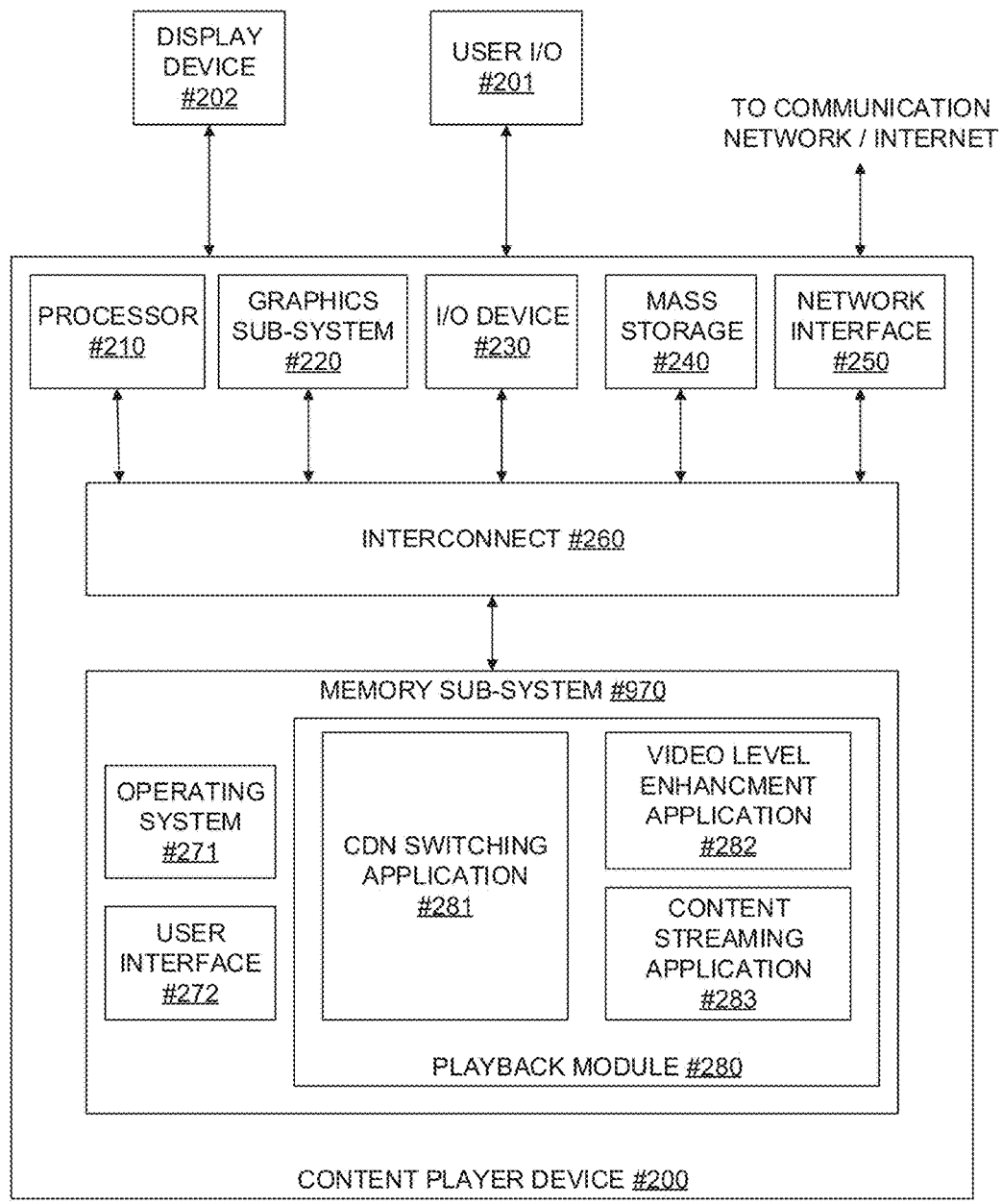
FIG. 2 conceptually illustrates a playback device in accordance with an embodiment of the invention.

A playback device that can be utilized to perform adaptive CDN switching of content in accordance with an embodiment of the invention is illustrated in FIG. 2. Playback device 200 typically includes a processor 210, graphics sub-system 220, I/O device 230, mass storage 240, network interface 250, interconnect 260, and memory sub-system 270. The memory subsystem may contain an operating system 271, user interface 272, and playback module 280. Many embodiments of the invention include a playback device 200 which has a playback module 280 that further includes a CDN switching optimization application 281, a video level optimization application 282, and content streaming application 283. Certain embodiments of the invention may have a playback device 200 that receives content via an interface with a communication network including, (but not limited to), the Internet. Additionally, further embodiments of the invention can include a display device 202 connected to the playback device 200. Still further embodiments of the invention can include user I/O 201 interfacing with a playback device 200.

While a variety of playback device systems are described above with reference to FIG. 2, other playback devices incorporating any of a variety of hardware enabling downloading and playback of content segments across multiple CDNs in accordance with any of a number of different processes for selecting the content segments across multiple CDNs can be utilized as appropriate to the requirements of specific applications in accordance with various embodiments of the invention. For example, in certain embodiments, a home gateway or other edge network device may select the content delivery network for streaming based on each client's capabilities, characteristics, local bandwidth, and requirements. Processes that can be utilized by playback devices to provide adaptive CDN switching of content in accordance with a number of embodiments of the invention are explored below.

Adaptive CDN Switching Processes

At a high level, processes for performing adaptive CDN switching involve connecting to a first CDN provider for streaming content, playing back the content and evaluating local playback conditions, determining a desired playback level, examining conditions necessary to explore switching to another CDN provider, and conducting that search should the conditions be met. Should an alternative CDN provider be found that can deliver the necessary content with better performance, continued streaming can then be affected through the alternative CDN instead of the first CDN. In many embodiments, conditions necessary to begin an alternative CDN search may include, but are not limited to, bandwidth of the first CDN, time spent streaming at the desired playback level, load balancing concerns, frequency of use, and/or rebuffering conditions. A process for performing adaptive CDN switching in accordance with an embodiment of an invention is shown in FIG. 3.

The process 300 may include determining (302) a default CDN from which to begin (304) streaming content. In many embodiments, the default CDN could be provided as a first URL in the manifest sent by the server or could be explicitly signaled to the optimal CDN by the server hosting the manifest. Determining (306) of playback variables may occur during streaming. These playback variables may include, but are not limited to, playback position, buffer duration, and/or bitrate estimation. Using playback variables, the player may determine (308) a desired playback level of the streamed content. In certain embodiments, the playback level may be determined by the current buffer duration and available bitrate estimate. During playback, the adaptive CDN switching player may evaluate (310) switching conditions which may require a search of alternative CDN providers to occur. When conditions are sufficient, the player may switch (312) CDN providers for increased performance.

Figure 3:
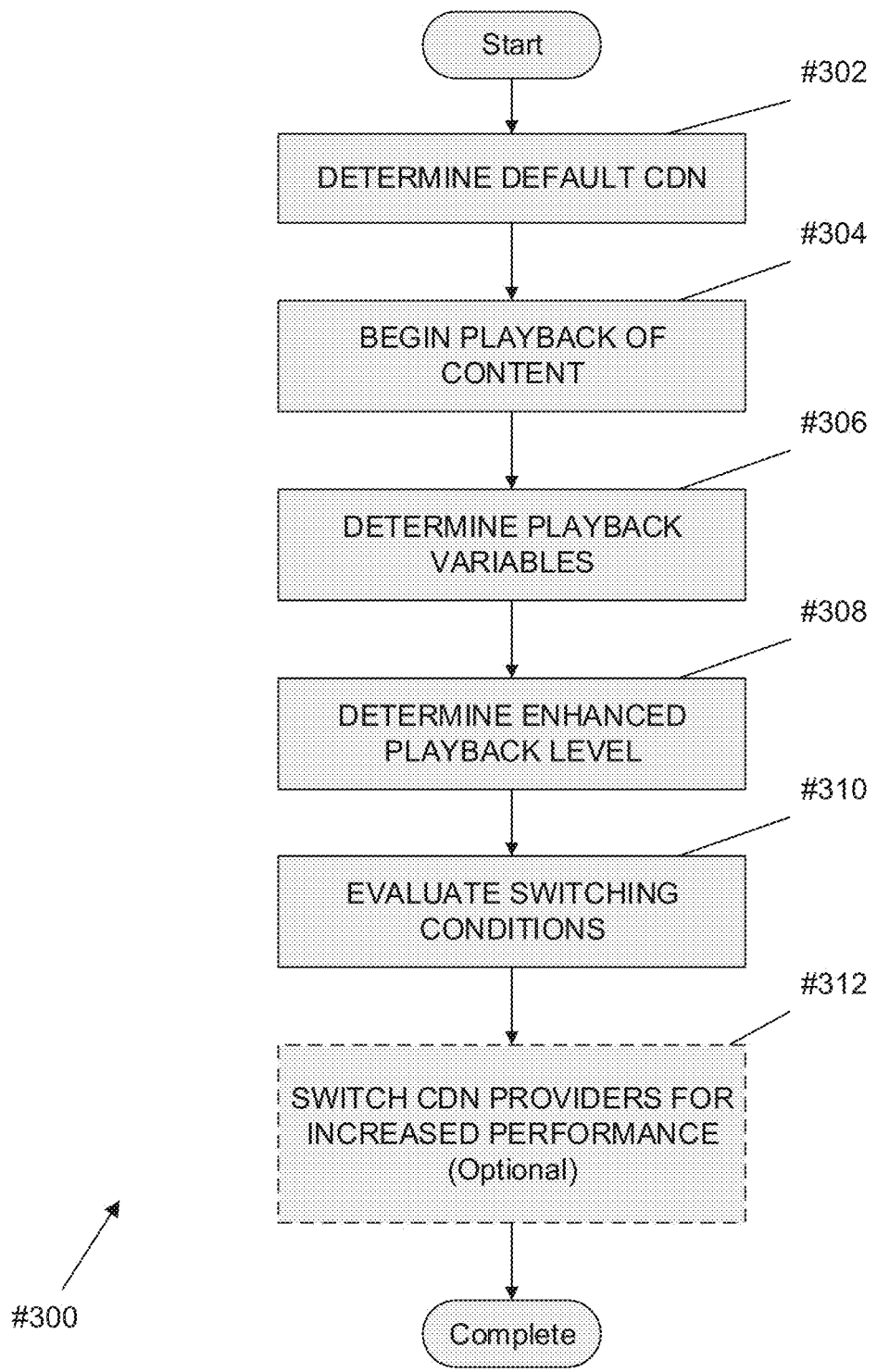
FIG. 3 is a flow chart illustrating a process for adaptive CDN switching in accordance with an embodiment of the invention.

Although specific processes are described above for performing adaptive CDN switching with reference to FIG. 3, any of a variety of processes for performing adaptive CDN switching can be utilized as appropriate to the requirements of specific applications in accordance with various embodiments of the invention. For example, a number of embodiments of the invention include customer driven selection of CDN providers that may include, but are not limited to, premium CDN selection for customers who pay for an increased level of service. The manner in which bitrate switching for desired playback is accomplished in adaptive CDN switching systems in accordance with several embodiments of the invention is discussed further below.

Processes for Achieving a Desired Playback Bitrate Level

A video level performance application can be utilized to evaluate and adjust the video bitrate level of streamed content during playback. As conditions change in the playback environment, decisions as to what quality or bitrate streamed content is being requested may need to be adjusted.

Figure 4:
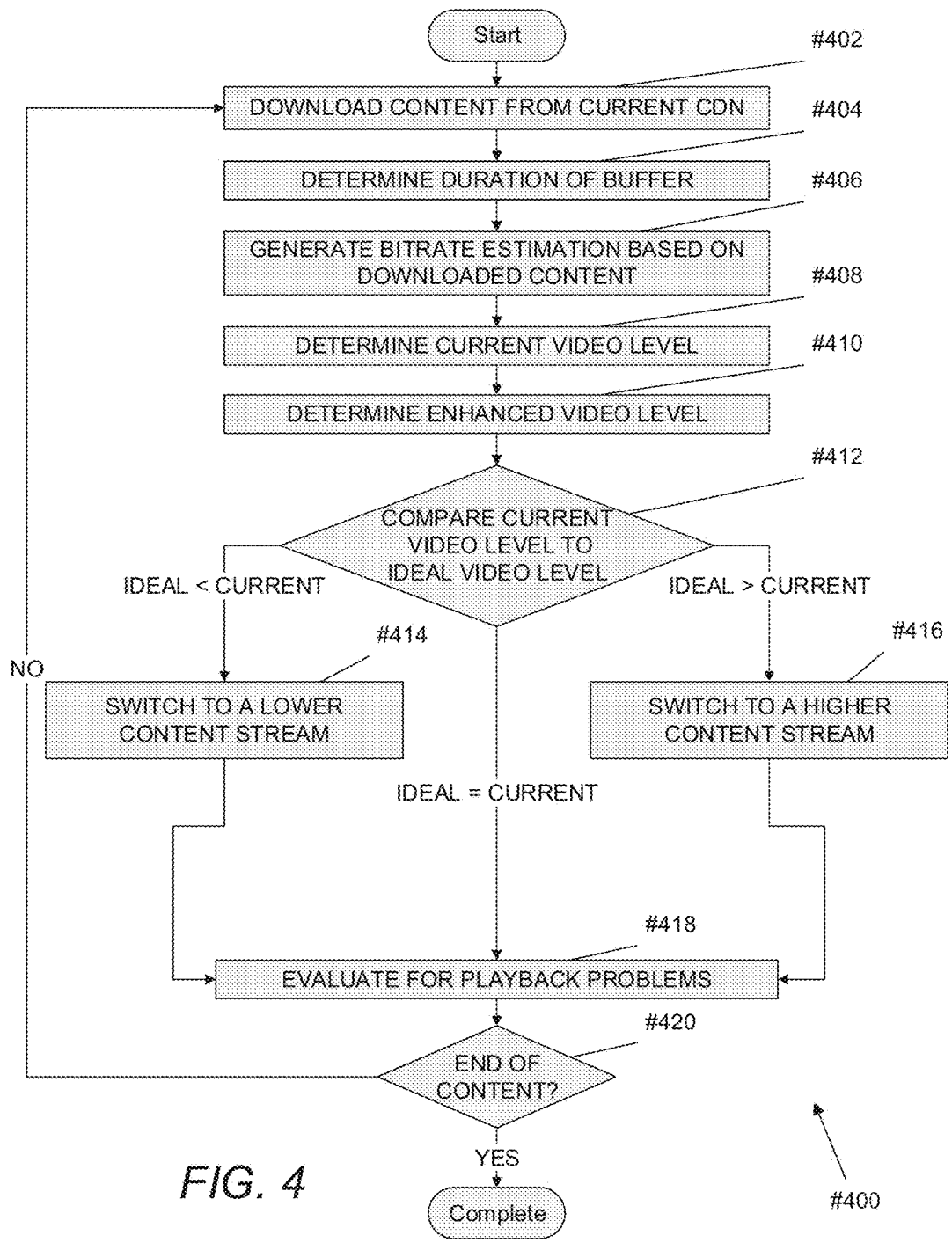
FIG. 4 is a flow chart illustrating a process for achieving an ideal video streaming level for use in adaptive CDN switching in accordance with an embodiment of the invention.

A process for evaluating the performance of streamed content in accordance with an embodiment of an invention is shown in FIG. 4. The process 400 may begin with downloading (402) at least one segment of content from a CDN provider. Downloaded content may be loaded into a buffer for playback. A determination (406) of the duration of this buffer may occur. Previously downloaded content may be evaluated for the generation (406) of a bitrate estimate. For example, in a number of embodiments, the bitrate estimation may be obtained based on the previous four seconds of downloaded content. The process 400 may then determine (408) a current video level. In many embodiments, this current video level may be determined from local playback conditions including, but not limited to, metadata present in the current streamed content segments, buffer duration and current bitrate estimate. The process 400 may also determine (410) an efficient video level based on all available data. In many embodiments, this data may include, but is not limited to, the current bitrate estimate. In certain embodiments, the determination (410) of an efficient video level may result in, but is not limited to, a higher bitrate of streamed content being sought for better quality, or a lower bitrate stream being sought to avoid running out of buffered material resulting in playback interruption. A comparison (412) may occur between the current video level and what the efficient video level would be. This comparison (412) may be achieved in a number of ways including, but not limited to, the evaluation of bitrates observed in the current bitrate estimate and bitrate estimates of other efficient video levels. Based upon this comparison (412), the video level performance application may switch (414) to a lower bitrate content stream, switch (416) to a higher bitrate content stream, or skip directly to evaluating (420) for other playback problems that may be present. In many embodiments, switching (414) to a lower bitrate content stream may be desired to avoid the current buffer from running out (underflowing) before downloading the next segment of content. In a number of embodiments, switching (416) to a higher bitrate content stream may only be allowed if some arbitrary duration of content (e.g. six seconds of content) can be downloaded before the buffer runs out to ensure a conservative approach to switching and avoiding rebuffering events. The process 400 may also evaluate (418) any other types of playback problems that may occur when achieving a desired bitrate level. These playback problems may include, but are not limited to, rebuffering problems, streaming content not playing at optimized levels, HTTP 404 errors, or other HTTP errors that may result in a disrupted playback experience. The process 400 may then evaluate (420) the content to determine if the downloaded segment is the last in the stream. If it is not, in many of the embodiments, the process 400 then begins again and downloads (402) the next segment of content from the CDN.

Although specific processes related to video level performance in adaptive CDN switching systems are described above with reference to FIG. 4, any of a variety of processes can be utilized for improving the performance of video levels for use in adaptive CDN switching in accordance with various embodiments of the invention. An example of a process of handling playback problems such as buffering that can be utilized during adaptive CDN switching in accordance with various embodiments of the invention is discussed further below.

Handling Buffering Problems in Adaptive CDN Switching Systems

One of the issues that may arise when streaming content is playback interruption. Playback interruption can occur from a number of factors including a depletion of the playback buffer. To avoid this, in many embodiments the video level can be switched to a lower level to allow for downloading of more content over the available bandwidth. In further embodiments, the amount of content in the buffer is routinely checked against the available bandwidth and bitrate estimates to better gauge if a playback interruption is likely to occur. In instances where a playback error may appear to be imminent, many embodiments of the invention may search alternative CDN providers in an attempt to find the necessary content segments. In a number of embodiments, the video bitrate level sought at alternative CDN providers is equal to the current video bitrate level in order to ensure a smooth transition between segments without the user noticing the switch.

Figure 5:
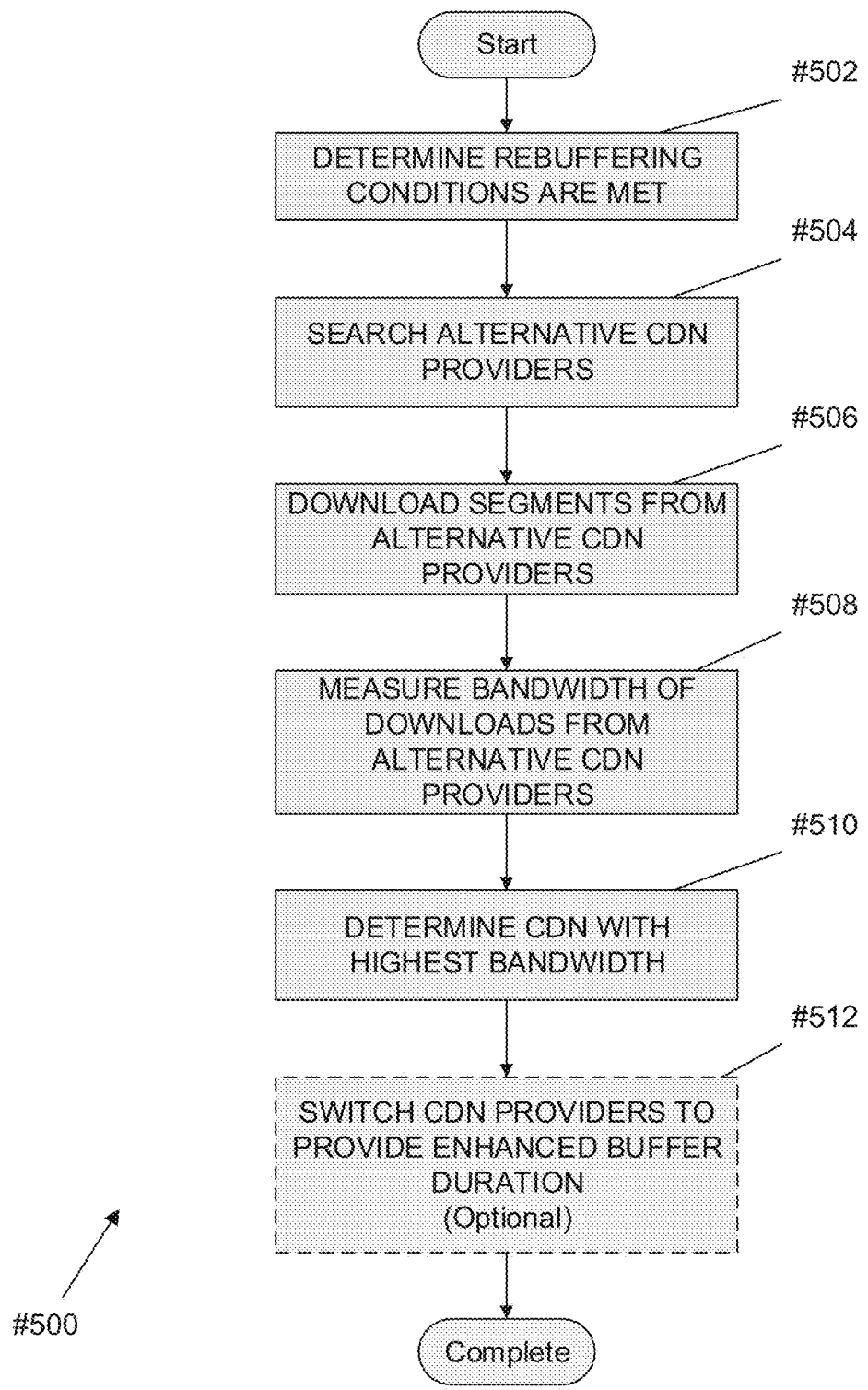
FIG. 5 is a flow chart illustrating a process for dealing with rebuffering problems in accordance with an embodiment of the invention.

A process for handling buffer problems for use in an adaptive CDN switching system in accordance with an embodiment of an invention is shown in FIG. 5. The process 500 determines (502) if the proper rebuffering conditions have been met. In some embodiments, these rebuffering conditions can include, but are not limited to, determining that the current video bitrate level is at the lowest bitrate level (verifying that the content needed to avoid rebuffering issues is not already available at the current CDN provider), and that the playback duration of the buffered content itself is below a pre-set threshold. In further embodiments, the threshold of the buffered content required to avoid a rebuffering problem is set to a static threshold (e.g. six seconds). In other embodiments, any of a variety of alternative thresholds and/or requirements related to the status of a playback device can be utilized to initiate a search of alternative CDN providers during an adaptive bitrate streaming session as appropriate to the requirements of a given application. When met, a search (504) of alternative CDN providers may occur. If available, content from the alternative CDN providers is downloaded (506). In a number of embodiments, only different segments from the currently downloaded segments are sought at the alternative CDNs to enable the buffers to be filled with valid data, thereby improving the chances of avoiding a buffer underflow. Measurement (508) of the bandwidth between the current and alternative CDN providers may occur. In a number of embodiments, the bandwidth probes may download a sufficient amount of data to provide an accurate measurement. In certain embodiments, the amount of data required may be two seconds worth of video data. As can readily be appreciated, the amount of data can correspond to any duration of content appropriate to the requirements of a given application. The process 500 may then determine (510) the CDN provider with the highest bandwidth available for download of remaining segments of content. The adaptive CDN switching system may then switch (512) CDN providers to increase the buffer duration as needed.

Although specific processes related to handling buffer problems in adaptive CDN switching systems are described above with reference to FIG. 5, any of a variety of processes can be utilized for handling buffer problems to avoid playback errors in accordance with various embodiments of the invention. An example of a process for handling playback problems such as enhancing the content bitrate level that can be utilized during adaptive CDN switching in accordance with various embodiments of the invention is discussed further below.

Enhancing Content Bitrate Levels in Adaptive CDN Switching Systems

In typical streaming applications, only a single CDN, is taken into account when determining and selecting which segments of content to stream. However, this method does not take into account the possible availability of higher quality or faster accessed content available on other CDN provider systems. An adaptive CDN switching system can be utilized to increase the quality of streamed content by accessing segments of content in alternative CDN systems that provide a higher bandwidth to the user.

Figure 6:
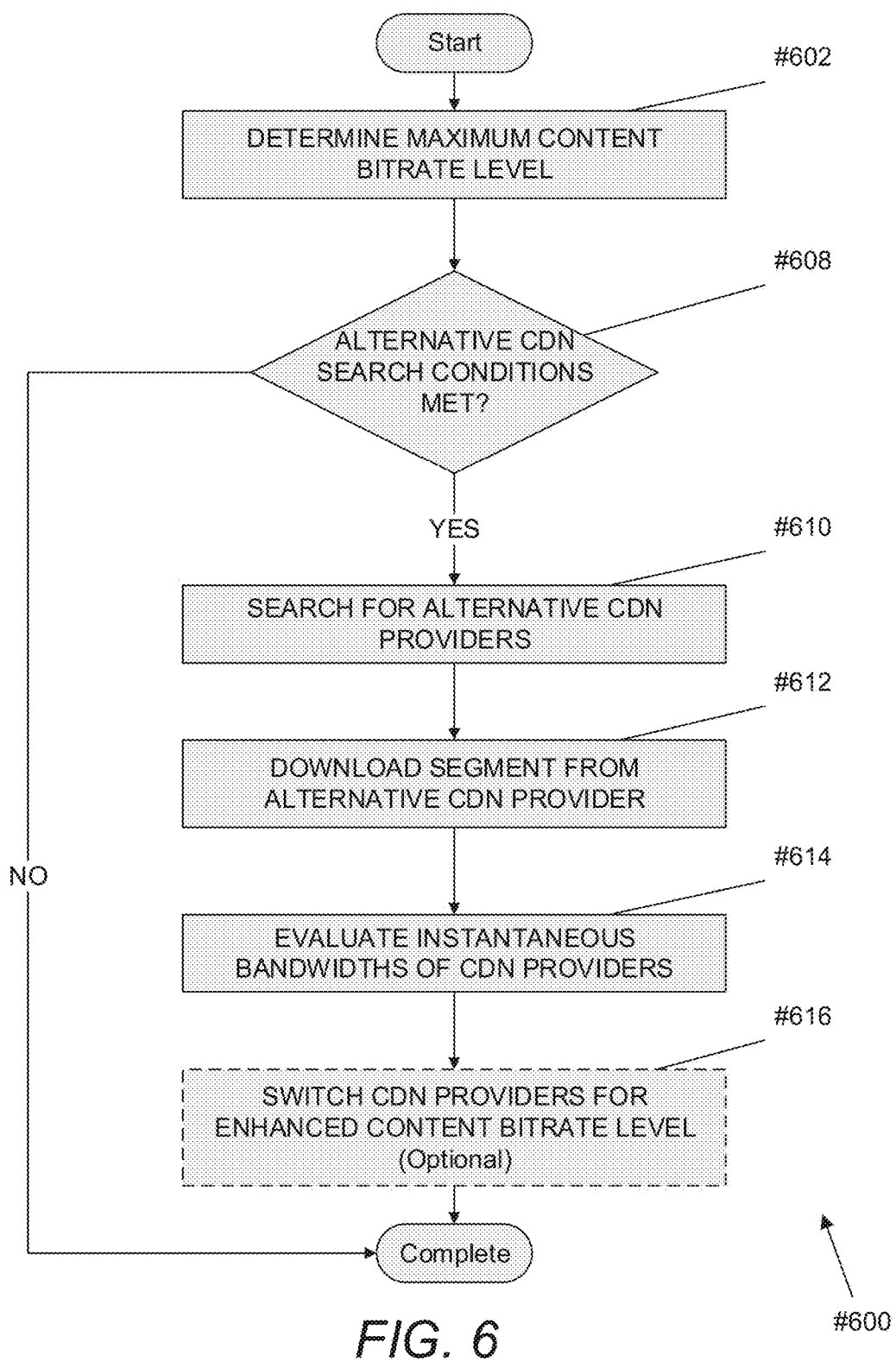
FIG. 6 is a flow chart illustrating a process for achieving an optimal video level across multiple CDNs in accordance with an embodiment of the invention.

A process for increasing content bitrate levels for use in adaptive CDN switching systems in accordance with an embodiment of an invention is shown in FIG. 6. The process 600 may determine (602) the highest bitrate level of the available content is available for downloading. An evaluation (604) may be done of certain conditions to determine if an alternative CDN search should occur. In certain embodiments of the invention, these conditions may include, but are not limited to, a necessary duration since the highest bitrate streaming occurred, as well as having a sufficient amount of buffer. If the conditions are met, a search (606) for alternative CDN providers may occur. Content segments may then be downloaded (608) from the alternative CDN provider. In a number of embodiments, the bitrate level of content downloaded is the same as the current bitrate level of the content downloaded from the current CDN to avoid a noticeable switch between content downloaded from the current CDN to the alternative CDN. The process 600 may then evaluate (610) the instantaneous bandwidths of the content downloaded from the alternative CDN providers against the bandwidth being provided from the current CDN provider. If necessary, a switch (612) to the alternative CDN provider may occur to enable downloading of content encoded at a higher bitrate level, which can translate into content that is of a higher perceived quality when downloaded and played back by the playback device.

Although specific processes related to enhancing bitrate download performance in adaptive CDN switching systems are described above with reference to FIG. 6, any of a variety of processes can be utilized for increasing bitrate levels to increase playback quality in accordance with various embodiments of the invention. An example of a process of handling playback problems such as HTTP 404 errors that can be utilized during adaptive CDN switching in accordance with various embodiments of the invention is discussed further below.

Process for Handling HTTP 404 Errors in Adaptive CDN Switching Systems

A HyperText Transfer Protocol (HTTP) 404 error occurs when a piece of data requested is not available. When downloading multiple segments of streaming content, many requests to download are sent out via HTTP. HTTP 404 errors are significant as they can directly lead to the interruption of playback. When encountering a HTTP 404 error, the request for the content may be sent again to verify the error. Additionally, requests may be sent for different bitrates of the same segment of content, or to different servers on the same content delivery network. However, in cases where the requested content is simply not available on the CDN, HTTP 404 errors cannot be avoided. In many embodiments, adaptive CDN switching systems may allow for handling of HTTP 404 errors by searching out for the same content on alternative CDN providers, allowing for the continuation of uninterrupted playback.

Figure 7:
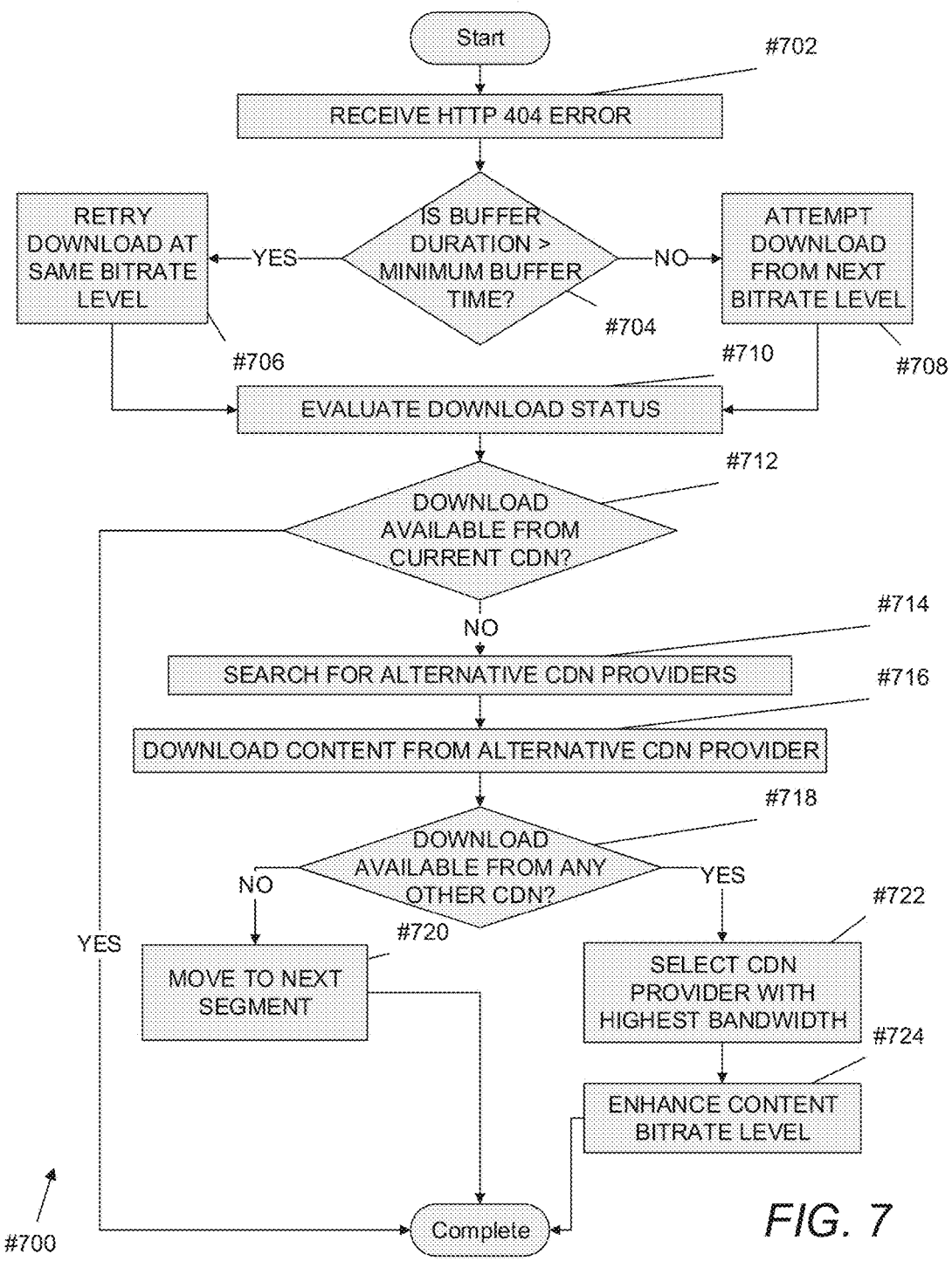
FIG. 7 is a flow chart illustrating a process for handling HTTP 404 errors across multiple CDNs in accordance with an embodiment of the invention.

A process for handling HTTP 404 errors for use in an adaptive CDN switching system in accordance with an embodiment of the invention is show in FIG. 7. When the adaptive CDN switching system receives (702) a HTTP 404 error, an evaluation (704) is done to determine if a sufficient amount of buffer exists compared to a pre-set threshold. In many embodiments, this pre-set threshold may be a minimum buffer time required and may be set at a static value (e.g. six seconds) or a dynamic value that varies based upon playback conditions including (but not limited to) the state of the playback device and/or the bitrate level of currently streamed content. If the buffer is sufficient, the process 700 may then retry (706) to download the content again at the same bitrate video level. If the buffer in not sufficient, then the process 700 may attempt (708) to download the content encoded at a lower bitrate level. After either retry (706) or attempt (708), an evaluation (710) is made to determine if the download was successful. If the download (712) is available from the current CDN, then no CDN switching is necessary. However, if the download (712) is not available from any available server on the CDN, a search (714) may occur for alternative CDN providers. The process 700 may then download (716) content from the alternative CDN to avoid playback interruptions. In a number of embodiments, the download from an alternative CDN provider is done at the lowest bitrate level to ensure the quickest possible recovery from the HTTP 404 error. An evaluation is made to determine if the download (718) was available from any other CDN. If no CDNs are able to provide the necessary content, playback moves (720) to the next segment. If the download (718) was available from multiple CDN sources, then the process 700 may select (722) the CDN provider with the higher bandwidth. The selection (724) of the optimal content bitrate level may then occur to maximize playback conditions.

Although specific processes related to handling HTTP 404 errors in adaptive CDN switching systems are described above with reference to FIG. 7, any of a variety of processes can be utilized for handling unavailable content to decrease playback interruptions in accordance with various embodiments of the invention. An example of a process of handling playback problems involving other HTTP errors that can be utilized during adaptive CDN switching in accordance with various embodiments of the invention is discussed further below.

Process for Handling Other HTTP Errors in Adaptive CDN Switching Systems

Other HTTP errors may occur when a piece of data is requested via HTTP. Examples of these types of errors include, but are not limited to, server disconnects, and server unavailable errors. HTTP errors of this nature tend to lead to playback interruptions on traditional systems. However, on adaptive CDN switching systems, the unavailable content may be sought on another CDN system, allowing for uninterrupted playback.

Figure 8:
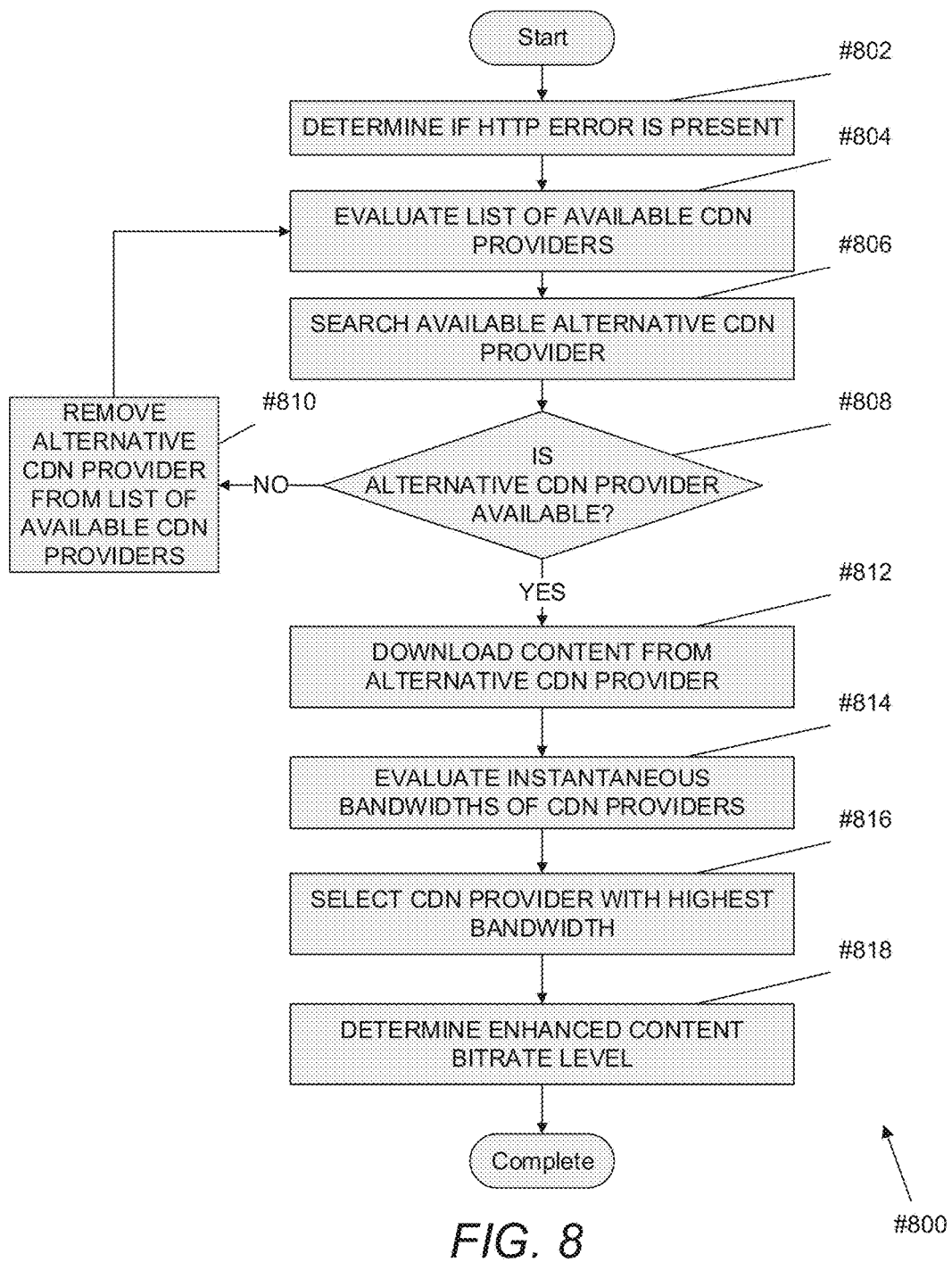
FIG. 8 is a flow chart illustrating a process for handling HTTP errors across multiple CDNs in accordance with an embodiment of the invention.

A process for handling HTTP errors for use in an adaptive CDN switching system in accordance with an embodiment of the invention is show in FIG. 8. When the adaptive CDN switching system receives (802) an HTTP error, an evaluation (804) is done against a list of known CDN providers to determine if any alternative CDN providers are still available for downloading the necessary content. In certain embodiments, this step may include the removal of the CDN provider that is experiencing HTTP errors. A search (806) may then be conducted for any alternative CDN providers that are not experiencing HTTP errors. The process 800 may then evaluate (808) if the alternative CDN provider is available for downloading content. If the alternative CDN provider is not available, then that CDN may be removed (810) from the list of available content providers and the process re-evaluates (804) the list of CDNs available. If the CDN is available, the process 800 may then download (812) content from the alternative CDN provider. Successful downloads may then be evaluated (814) for their instantaneous bandwidth speeds. If multiple CDNs are available, the process 800 may select (816) the CDN provider with the highest available bandwidth. Once selected, the process 800 may determine (818) a higher bitrate of content level. In a number of embodiments, this bitrate level may be determined by the playback buffer duration amount.

In many embodiments, the adaptive CDN switching system playback device may keep a record of known CDNs and their historical statuses including, but not limited to, the amount of time a requested download may take and if the known CDNs were reachable. In this way, because of the time consuming nature of determining timeout and/or download errors, the adaptive switching systems may avoid selecting alternative CDNs that are known to be unreachable or unreliable. In a number of embodiments, these stored records are purged on a periodic basis. In certain embodiments, the stored records of known CDNs stored in the playback device may be transmitted to a server for further processing. In further embodiments of the invention, the URL request may include information about the geographic location and capabilities of the adaptive CDN switching system playback device. In still further embodiments, the playback device may receive a list of known CDNs from a central server. In yet still further embodiments, the server may evaluate the status of CDN systems based on the stored records transmitted from the adaptive CDN switching system playback device(s). These evaluations may include, but are not limited to, geographic areas and the playback device's capabilities. In yet still more embodiments, the server may filter CDNs provided in the manifests based on the evaluations made from the stored records transmitted from the adaptive CDN switching system playback devices. It should be appreciated by one skilled in the art that any of a variety of processes for generating top level index files based on geographic location can be utilized in adaptive CDN switching systems as appropriate to the requirements of the specific applications in accordance with embodiments of the invention including, but not limited to, the automatic generation of top level index files as disclosed in U.S. Pat. No. 8,787,570. The disclosure of U.S. Pat. No. 8,787,570 including the relevant disclosure related to the dynamic generation of top level index files is hereby incorporated by reference in its entirety.

Although specific processes related to handling HTTP errors in adaptive CDN switching systems are described above with reference to FIG. 7, any of a variety of processes can be utilized for handling network interruptions to decrease playback interruptions in accordance with various embodiments of the invention. An example of a process of handling playback problems involving other HTTP errors that can be utilized during adaptive CDN switching in accordance with various embodiments of the invention is discussed further below.

Although the present invention has been described in certain specific aspects, many additional modifications and variations would be apparent to those skilled in the art. It is therefore to be understood that the present invention may be practiced otherwise than specifically described, including various changes in the implementation, without departing from the scope and spirit of the present invention. Thus, embodiments of the present invention should be considered in all respects as illustrative and not restrictive.

The invention claimed is:

1. An adaptive content delivery network switching device comprising:
   a processor;
   a network interface; and
   a memory connected to the processor, where the memory contains a content delivery network switching application and a media playback application;
   wherein the content delivery network switching application directs the processor to:
      receive at the adaptive content delivery network switching device a manifest from a manifest server system describing a plurality of content delivery networks;
      determine using the adaptive content delivery network switching device a first content delivery network selected from the received manifest;
      receive at the adaptive content delivery network switching device content from the first content delivery network;
      evaluate using the adaptive content delivery network switching device if a performance threshold is being satisfied;
      select using the adaptive content delivery network switching device an alternative content delivery network from the received manifest;
      receive at the adaptive content delivery network switching device new content from the alternative content delivery network;
      evaluate using the adaptive content delivery network switching device a bandwidth for the first content delivery network and the alternative content delivery network; and
      determine at the adaptive content delivery network switching device further requests for new content from either the first content delivery network or the alternative content delivery network based upon the evaluated bandwidths and the performance threshold; and
   wherein the media playback application directs the processor to:
      play back the received content and the received new content using the adaptive content delivery network switching device.

2. The adaptive content delivery network switching device of claim 1 wherein the performance threshold comprises satisfying a buffer threshold.

3. The adaptive content delivery network switching device of claim 1 wherein the performance threshold is dynamically generated.

4. The adaptive content delivery network switching device of claim 3 wherein the evaluation of the bandwidth for the first content delivery network and alternative content delivery network occur upon each dynamic generation of the minimum performance threshold.

5. The adaptive content delivery network switching device of claim 1 wherein the performance threshold comprises satisfying a playback bitrate threshold.

6. The adaptive content delivery network switching device of claim 1 wherein the performance threshold is not satisfied when a HyperText Transfer Protocol (HTTP) 404 error is detected.

7. The adaptive content delivery network switching device of claim 1 wherein the performance threshold is not satisfied when a HyperText Transfer Protocol (HTTP) error is detected.

8. The adaptive content delivery network switching device of claim 1 wherein the new content received is at the same quality level of the previously received content.

9. The adaptive content delivery network switching device of claim 1 wherein the content delivery network switching application further directs the processor to create a record of any content delivery network that encounters a HyperText Transfer Protocol (HTTP) error.

10. The adaptive content delivery network switching device of claim 9 wherein the content delivery network switching application further directs the processor to avoid receiving content from any content delivery network that is in the record of HyperText Transfer Protocol (HTTP) errors.

11. A method for adaptive content delivery network switching comprising:
   receiving at a playback device a manifest from a manifest server system;
   determining using the playback device a first content delivery network from multiple specified content delivery networks in the manifest received from the manifest server system;
   receiving at the playback device content from a first content delivery network;
   evaluating using the playback device if a performance threshold for playback on the playback device is being satisfied;
   selecting using the playback device an alternative content delivery network from the received manifest;
   receiving at the playback device new content on the playback device from the alternative content delivery network;
   evaluating using the playback device a bandwidth on the playback device for the content received from the first content delivery network and the alternative content delivery network;
   determining using the playback device further requests for new content from either the first content delivery network or the alternative content delivery network based upon the evaluated bandwidths and the performance threshold; and
   playing back the received content and the received new content using the playback device.

12. The method of claim 11 wherein the performance threshold comprises satisfying a buffer threshold.

13. The method of claim 12 wherein the buffer threshold is at least six seconds.

14. The method of claim 11 wherein the performance threshold comprises satisfying a minimum playback bitrate threshold.

15. The method of claim 11 wherein the performance threshold is not satisfied if a HyperText Transfer Protocol (HTTP) 404 error is detected.

16. The method of claim 11 wherein the performance threshold is not satisfied if a HyperText Transfer Protocol (HTTP) error is detected.

17. The method of claim 11 wherein the new content received is at the same quality level of the previously received content.

18. The method of claim 11, further comprising recording any content delivery network that encounters a HyperText Transfer Protocol (HTTP) error.

19. The method of claim 18, further comprising avoiding receiving content from a second content delivery network from any content delivery network that is in the record of HyperText Transfer Protocol (HTTP) errors.

20. The method of claim 11 wherein the performance threshold is dynamically generated on the playback device.

21. The method of claim 20 wherein the evaluation of the bandwidth for the first content delivery network and alternative content delivery network occur upon each dynamic generation of the performance threshold on the playback device.

* * * * *

UNITED STATES PATENT AND TRADEMARK OFFICE
CERTIFICATE OF CORRECTION

| | |
|---|---|
| PATENT NO. | : 10,498,795 B2 |
| APPLICATION NO. | : 15/436456 |
| DATED | : December 3, 2019 |
| INVENTOR(S) | : Mayur Srinivasan, Stephen Bramwell and Giang Pham |

It is certified that error appears in the above-identified patent and that said Letters Patent is hereby corrected as shown below:

In the Claims

Claim 4, Column 12, Line 51, delete "minimum".

Claim 19, Column 14, Line 24, delete "from a second content delivery network".

Signed and Sealed this
Fourteenth Day of July, 2020

Andrei Iancu
*Director of the United States Patent and Trademark Office*